(12) United States Patent
Barinaga

(10) Patent No.: US 8,140,549 B2
(45) Date of Patent: Mar. 20, 2012

(54) METHODS AND ARRANGEMENTS OF PROCESSING AND PRESENTING INFORMATION

(76) Inventor: Juan Carlos Barinaga, Houston, TX (US)

( * ) Notice: Subject to any disclaimer, the term of this patent is extended or adjusted under 35 U.S.C. 154(b) by 605 days.

(21) Appl. No.: 12/260,386

(22) Filed: Oct. 29, 2008

(65) Prior Publication Data

US 2009/0112922 A1   Apr. 30, 2009

Related U.S. Application Data

(60) Provisional application No. 60/984,373, filed on Oct. 31, 2007, provisional application No. 61/057,277, filed on May 30, 2008.

(51) Int. Cl.
*G06F 7/00* (2006.01)

(52) U.S. Cl. ........................ 707/756; 715/200

(58) Field of Classification Search ............ 707/756
See application file for complete search history.

(56) References Cited

U.S. PATENT DOCUMENTS

| | | | |
|---|---|---|---|
| 5,317,686 A | 5/1994 | Salas et al. | |
| 5,524,244 A | 6/1996 | Robinson et al. | |
| 5,572,644 A | 11/1996 | Liaw et al. | |
| 5,590,259 A | 12/1996 | Anderson et al. | |
| 5,633,998 A | 5/1997 | Schlafly | |
| 5,819,293 A | 10/1998 | Comer et al. | |
| 5,848,187 A | 12/1998 | Bricklin et al. | |
| 5,880,742 A | 3/1999 | Rao et al. | |
| 6,002,865 A | 12/1999 | Thomsen | |
| 6,185,582 B1 * | 2/2001 | Zellweger et al. | 715/212 |
| 6,988,241 B1 | 1/2006 | Guttman et al. | |
| 7,082,569 B2 | 7/2006 | Voshell | |
| 7,266,763 B2 | 9/2007 | Peyton-Jones et al. | |
| 7,792,847 B2 * | 9/2010 | Dickerman et al. | 707/756 |
| 2001/0016855 A1 | 8/2001 | Hiroshige | |
| 2002/0004801 A1 | 1/2002 | Todd | |
| 2002/0065846 A1 | 5/2002 | Ogawa et al. | |
| 2002/0091728 A1 | 7/2002 | Kjaer et al. | |
| 2002/0169799 A1 | 11/2002 | Voshell | |
| 2003/0149708 A1 | 8/2003 | Tsao | |

(Continued)

FOREIGN PATENT DOCUMENTS

| | | |
|---|---|---|
| EP | 0 424 407 | 12/1989 |
| EP | 1 323 066 | 1/2002 |
| EP | 1 256 890 A2 | 11/2002 |

(Continued)

OTHER PUBLICATIONS

Brodbeck, Dominique, et al., "Domesticating Bead: Adapting an Information Visualization System to a Financial Institution," Information Visualization, 1997, Proceedings, IEEE Symposium, Oct. 20-21, 1997, pp. 73-80.

(Continued)

*Primary Examiner* — Fazlul Quader
(74) *Attorney, Agent, or Firm* — Schubert Law Group PLLC; Neil K. Cohen

(57) ABSTRACT

Embodiments include systems, apparatuses, transformations, code, state machines or other logic to perform spreadsheet operations. Some embodiments may provide a text-based interface to a spreadsheet. In further embodiments, a spreadsheet may create, modify, and access spreadsheet objects in response to text entered into the text-based interface. The text-based interface may comprise a command interface. Many embodiments may provide networks to a spreadsheet. The networks may include nodes, flow objects, and the assignment of flow objects to nodes. Several embodiments may enable the assignment of units to elements of a spreadsheet. Numerous embodiments may operate with arrays of three or more dimensions. Some embodiments may comprise non-spreadsheet applications.

25 Claims, 12 Drawing Sheets

U.S. PATENT DOCUMENTS

| | | |
|---|---|---|
| 2003/0226105 A1 | 12/2003 | Waldau |
| 2004/0044954 A1 | 3/2004 | Hosea |
| 2006/0161844 A1 | 7/2006 | Simkhay et al. |
| 2007/0055556 A1 | 3/2007 | Frank-Backman et al. |

FOREIGN PATENT DOCUMENTS

| | | |
|---|---|---|
| WO | WO 01/11445 A2 | 2/2001 |
| WO | WO 2008/015395 A2 | 2/2008 |

OTHER PUBLICATIONS

Burnett, M., et al., "End-User Software Engineering with Assertions in the Spreadsheet Paradigm," 25th IEEE Int. conf. on Software Engineering, May 2003, pp. 1-11.

Burnett, M., et al., "Exception Handling in the Spreadsheet Paradigm," Software Engineering, IEEE Transactions, Oct. 2000, vol. 26, Issue 10, pp. 923-942.

Djang, R. W., et al., "Similarity Inheritance: A New Model of Inheritance for Spreadsheet VPSs," Visual Languages, 1998. Proceedings. 1998 IEEE Symposium, Sep. 1-44, 1998, pp. 134-141.

Rothermel, G., "Helping End-User Programmers "Engineer" Dependable Software," Quality Software, 2006. QSIC 2006. Sixth International Conference, Oct. 2006, pp. 11-11.

Ruthruff, J. et al., "End-User Software Visualizations for Fault Localization," ACM Symposium on Software Visualization, San Diego, CA, Jun. 2003, pp.-1.

\* cited by examiner

FIG. 4

|   | A | B | C | D | E | F | G | H | I | J |
|---|---|---|---|---|---|---|---|---|---|---|
| 1 | Dimensions Objects Data: | | | | | | | | | |
| 2 | | | | | | | | | | |
| 3 | Colors | Cars | Countries | | | | | | | |
| 4 | Red | Chevy | USA | | | | | | | |
| 5 | Blue | Ford | Canada | | | | | | | |
| 6 | Green | Toyota | Mexico | | | | | | | |
| 7 | | | | | | | | | | |
| 8 | | | | | | | | | | |
| 9 | | | | | | | | | | |
| 10 | Arrays Objects Data: | | | | | | | | | |
| 11 | | | | | | | | | | |
| 12 | | | Chevy | Chevy | Ford | Ford | Ford | Toyota | Toyota | Toyota |
| 13 | Sales USD/Resident | Red | Blue | Green | Red | Blue | Green | Red | Blue | Green |
| 14 | USA | 52.8 | 27.5 | 90.1 | 47.8 | 80.3 | 87.0 | 10.8 | 18.6 | 29.3 |
| 15 | Canada | 54.9 | 56.0 | 55.7 | 57.9 | 28.1 | 54.4 | 32.5 | 12.9 | 23.4 |
| 16 | Mexico | 28.3 | 8.3 | 6.7 | 20.9 | 22.1 | 12.1 | 21.8 | 21.7 | 20.1 |
| 17 | | | | | | | | | | |

METHODS AND ARRANGEMENTS OF PROCESSING AND PRESENTING INFORMATION

CROSS-REFERENCE TO RELATED APPLICATIONS

This patent application claims priority under provisional Patent Application 60/984,373 filed on Oct. 31, 2007, the entire contents of which are hereby incorporated by reference. This patent application also claims priority under provisional Patent Application 61/057,277 filed on May 30, 2008, the entire contents of which are hereby incorporated by reference.

BACKGROUND OF THE INVENTION

The present invention is in the field of computer processing. More particularly, the present invention relates to methods and arrangements for the processing and presentation of information, including the processing and presentation of information by spreadsheets and other applications.

BRIEF SUMMARY OF THE INVENTION

Methods and arrangements to process and present information are presented. One embodiment provides a method of performing operations by a spreadsheet. The method may include creating, modifying and accessing the elements of a multidimensional array. The array may have has three or more dimensions. The spreadsheet may display the elements of the array as cells of the spreadsheet.

The method may also include creating a network with nodes and flow objects. A node may include zero or more design parameters. The operation of the node may be based upon the design parameters. A node may also include zero or more state parameters specifying a state of the node. A flow object may also include zero or more design parameters and zero or more state parameters. The operation of the flow object may be based upon the design parameters, and the state parameters may specify a state of the flow object. The network may also include an assignment of flow objects to node objects as input and output. The method may include modifying the network and accessing the network. The network may be used to create artificial neural networks, with each node representing a neuron. The network may also be used to create system dynamics diagrams with each node representing an object within the diagram.

The method may include assigning one or more units to an element of a spreadsheet. The units may consist of units of measurement. The method may include performing calculations with the element of the spreadsheet. The calculations may include type-checking values of the element of the spreadsheet.

The method may include performing operations in response to commands entered through a text-based or visual interface. The operations may include creating a spreadsheet object. The creating may include assigning a name to the spreadsheet object and specifying a set of parameters for the object. The operations may also include assigning properties to the spreadsheet object by evaluating an expression entered through the interface which contains the name of the spreadsheet object. The operations may include accessing properties of the spreadsheet object.

The method may include creating, accessing, and modifying dimensions. Dimensions are data structures which contain a list of elements. The elements within a dimension may be unique and may be in a specified order. The method may include creating, accessing, and modifying an object of filter type. A filter object may reference elements of dimensions. In some embodiments, a filter object may refer to the elements of an array whose coordinates match the elements of the dimensions referred to be the filter object.

The method may include creating and displaying visualization objects, including graphs, reports, tables and charts. The method may also include creating and displaying a report, or a series of visualization objects. The reports may be produced by iterating over the elements of a dimension, and producing a visualization object for each element. The method may also include creating presentation files. The presentation files may be composed of a series of reports.

Embodiments may include creating in the spreadsheet a multidimensional array object, wherein the object has three or more dimensions; accessing the data contents of the object, the accessing comprising displaying the data contents of the object as cells of the spreadsheet; and modifying the data contents of the object via modifying the contents of the cells of the spreadsheet. Embodiments may also include providing by the spreadsheet a dimension type, an object of the type comprising a list of elements; and creating in the spreadsheet a plurality of dimension objects. In further embodiments, the creating the multidimensional array object may comprise assigning a dimension object to each dimension of the multidimensional array object, wherein the elements of the dimension object constitute the coordinates of the array along the dimension. In further embodiments, the accessing may include invoking a function call. In further embodiments, the invoking may include identifying the multidimensional array object via a value of a parameter of the function; and specifying one or more elements of each of the dimension objects via one or more values of one or more other parameters of the function. Embodiments may also include creating a top-level array object of one or more dimensions, wherein one or more elements of the top-level array object constitute an array object. In further embodiments, the accessing may comprise accessing content from an external data source, the external data source comprising a table, the accessing content from the external data source comprising specifying the location of the external data source via a property in the multidimensional array object; and specifying a name of the table. In further embodiments, the external data source may comprise a database; and embodiments may also include adding a record to a table of the database, wherein the record contains a path to a workbook of the spreadsheet and a name of the multidimensional array. In further embodiments, the referencing may comprise referencing the spreadsheet coordinates of the cell containing the value of the dimension element. Embodiments may include linking a multidimensional array object of a first workbook to a multidimensional array object of a second workbook, the linking comprising specifying a path to the second workbook; specifying a name to the second workbook; specifying a name of the multidimensional array object of the second workbook; and specifying an external array object name; and referring to the multidimensional array object of the second workbook via a reference to the multidimensional array object of the first workbook. In further embodiments, the external data source may comprise a database; and the assigning a dimension object to each dimension of the multidimensional array object may comprise creating a dimension object corresponding to a field in the database, wherein each element of the dimension object corresponds to an entry in the field of the database; and assigning the dimension object to the multidimensional array object. In further embodiments, the creating, modifying, and accessing comprise creating, modifying, and accessing via a text-based interface. In further embodiments, the creating may comprise assigning units of measurement to elements of the object; and the method may comprise performing calculations with the element of the object, the performing comprising type-checking values of the element of the spreadsheet. Embodiments may also include providing by a spreadsheet a dimension type, a dimension object comprising one or more elements; creating by the spreadsheet a dimension object, the creating comprising assigning to each element of the object a name unique in the dimension; and specifying a sequence of the one or more elements. Embodiments may include creating a first dimension object comprising one or more elements; and creating a second dimension object, comprising one or more elements, wherein the one or more elements of the second dimension object represent subclasses of the one or more elements of the first dimension object. Embodiments may include creating a third dimension object comprising one or more elements; and creating a filter dimension object, wherein a mapping maps each element of the filter dimension object to a unique element of the third dimension object. Embodiments may include identifying a map between elements of two dimensions, the mapping comprising a combination of hierarchical and filter relationships between the elements of dimensions. Embodiments may include modifying the dimension object, thereby producing a modified dimension object, the modifying comprising renaming elements of the dimension object; deleting elements of the dimension object; and adding elements to the dimension object; and mapping elements of the dimension object to elements of the modified dimension object. In further embodiments, the creating by the spreadsheet a dimension object may comprise creating in the spreadsheet a filter object, wherein each element of the filter object names an element of a dimension object. In further embodiments, the creating the filter object may comprise creating an array based upon a set of dimensions, wherein each element of the filter object references one or more elements of the dimensions of the set of dimensions. In further embodiments, the creating the filter object comprises specifying a Boolean combination of the elements of the filter. In further embodiments, creating the filter object may comprise creating a filter object containing one element from each dimension of the set of dimensions of the array. In further embodiments, the creating may comprise creating a filter object from an expression containing elements of one or more dimension objects. Embodiments may also include creating a plurality of objects of type dimension, an object of the type comprising a list of elements; creating an multidimensional array object, the creating comprising assigning a dimension object to each dimension of the multidimensional array object, wherein the elements of the dimension object constitute the coordinates of the array along the dimension; creating an filter object, the filter object comprising designations of elements from two or more of the dimensions assigned to the array object, the designations in a specified sequence; and accessing elements of the array object via the filter object. In further embodiments, creating a multidimensional array may comprise assigning a filter object to a dimension of a multidimensional array. Embodiments may also include providing a visualization type; creating an visualization object, the creating comprising specifying a name of a subroutine for initializing the visualization object; specifying one or one or more parameters of the subroutine; supplying values for the parameters; and displaying via the visualization object the objects supplied as values of the parameters. Embodiments may further comprise providing a report type; and creating a report object, the creating comprising specifying a dimension and a workbook range; and displaying the report object, the displaying comprising displaying in the specified worksheet range a visualization object for each element of the dimension. Embodiments may include providing a presentation type; creating a presentation object, the creating comprising specifying a sequence of one or more reports; and creating a presentation object file based upon the presentation object, the presentation object file containing the one or more reports in the specified sequence. In further embodiments, creating the presentation object file further comprises inserting in the presentation object file information based upon a first visualization object of the presentation object; inserting in the presentation object file information based upon a second visualization object of the of the presentation object; and automatically inserting by the spreadsheet in the information of the presentation object file based upon the first visualization object of the presentation object a hyperlink to the information of the presentation object file based upon the second visualization object of the presentation object, the inserting in response to a request to link the first visualization object and the second visualization object. Embodiments may also include receiving an expression parameter within the first visualization object of the presentation object file; and inserting the hyperlink may comprise determining a hyperlink location and destination based upon the expression parameter. In further embodiments, the creating comprises specifying a subroutine; and editing the visualization object via the subroutine. Embodiments may also include providing by a spreadsheet a network type; creating in the spreadsheet an network object, wherein the object comprises a plurality of node objects, wherein a node object comprises one or more design parameters, wherein the operation of the node object is based upon the design parameters; and zero or more state parameters specifying a state of the node; and plurality of flow objects, wherein a flow object comprises one or more design parameters, wherein the operation of the flow object is based upon the design parameters; and zero or more state parameters specifying a state of the flow object; and an assignment of flow objects to node objects as input and output; modifying the network object; and accessing the network object. In further embodiments, the creating may comprise creating an object of type multidimensional array, wherein the multidimensional array object represents the network. Embodiments may also include assigning one or more units to an element of a spreadsheet; and performing calculations with the element of the spreadsheet, the performing comprising type-checking values of the element of the spreadsheet. In further embodiments, the assigning may comprise assigning a unit of measurement to the element; and the performing calculations may comprise receiving a value of the element in a comparable unit of measurement and converting the value to the unit of measurement. In further embodiments, the assigning may comprise assigning a unit to an argument of a function. In further embodiments, the assigning comprises creating a spreadsheet element with a plurality of values; and maintaining the values separately, wherein the maintaining comprises assigning a first unit to a first value of the plurality of values; and assigning a distinct unit or not assigning a unit to a second value of the plurality of values. In further embodiments, the creating may comprise creating a spreadsheet element representing a complex number, the spreadsheet element comprising a first value and a second value; and maintaining the values separately may comprise not attaching a unit to the first value and attaching a unit i, wherein i represents a square root of −1, to the second value. Embodiments may also include providing by a spreadsheet a text-based interface; creating a spreadsheet object; the creating comprising assigning a name to the spreadsheet object; and specifying a set of parameters for the spreadsheet object, wherein the creating comprises evaluating an expression entered via the text-based interface; and assigning one or more values to one or more elements of the spreadsheet object, the assigning comprising evaluating an expression entered via the text-based interface, the expression containing the name of the spreadsheet object; and accessing a value of an element of the spreadsheet object via the text-based interface. Embodiments may include evaluating an expression entered by a user into the text-based interface. In further embodiments, the creating may comprise creating a function object, the function object comprising one or more arguments; assigning a name may comprise assigning a name to the function object; and evaluating an expression may comprise applying the function to a set of values of the one or more arguments of the function, wherein the expression may comprise the name of the function object and a set of values of the one or more arguments of the function. Embodiments may include calculating a derivative of the function at a set of values of the arguments of the function. Embodiments may include calculating a definite integral of the function. Embodiments may also include providing an internet function type; creating an internet function object, the creating comprising providing a set of parameters, a URL location of a function, and an identifier as to the object type which is returned by the function; and executing the function, the executing comprising providing values for the parameters, and applying the function to the values of the parameters.

Embodiments may also include providing for a method which converts specific objects into an index result which can be stored in a spreadsheet cell or function result and back from the index result into the specific object. Embodiments may also include defining the type checking structure of existing functions, so that units of measure can be used within spreadsheet functions. Embodiments may also include providing for a method which converts the specific objects referred to by the indexes from the values of a subset array into a collection of the specified objects. Embodiments may also include objects defined by expressions which evaluate to the properties of the object. Embodiments may also include links to objects in external data sources, including other spreadsheets or workbooks. Embodiments may also include accessing external multidimensional databases through an array type object in the spreadsheet.

Embodiments may also include a system for the processing and presentation of information. The system may include a spreadsheet server to receive instructions over a network, to perform calculations, and to transmit the calculations over the network. The calculations may include creating a multidimensional array object, storing data in the object, modifying the data of the object, and accessing the object. Embodiments may also include a computing device to perform spreadsheet operations. The operations may include creating a multidimensional array object, storing data in the object, modifying the data of the object, and accessing the object. Embodiments may also include an apparatus to process and present information. The apparatus may include a processor containing memory. The processor may perform operations to create a multidimensional array object, store data in the object, modify the data of the object, and access the object.

BRIEF DESCRIPTION OF THE SEVERAL VIEWS OF THE DRAWINGS

An explanation of the invention will become apparent upon read the following detailed description and upon reference to the accompanying drawings in which like references may indicate similar elements:

FIG. 4 depicts an exemplary worksheet of an array based upon dimensions;

DETAILED DESCRIPTION OF THE INVENTION

The following is a detailed description of embodiments of the invention depicted in the accompanying drawings. The embodiments are in such detail as to clearly communicate the invention. However, the amount of detail offered is not intended to limit the anticipated variations of embodiments; but on the contrary, the intention is to cover all modifications, equivalents, and alternatives falling within the spirit and scope of the present invention as defined by the appended claims. The detailed descriptions below are designed to make such embodiments obvious to a person of ordinary skill in the art.

Generally speaking, methods and arrangements to perform operations for the processing and presentation of information are contemplated. Embodiments include systems, computing devices, apparatuses, transformations, code, state machines or other logic to create, modify and access the elements of a multidimensional array. The array may have multiple dimensions, including but not limited three or more. In embodiments involving spreadsheets, a spreadsheet may display the elements of the array as cells of the spreadsheet.

Embodiments may also include creating a network with nodes and flow objects. A node may include zero or more design parameters. The operation of the node may be based upon the design parameters. A node may also include zero or more state parameters specifying a state of the node. A flow object may also include zero or more design parameters and zero or more state parameters. The operation of the flow object may be based upon the design parameters, and the state parameters may specify a state of the flow object. The network may also include an assignment of flow objects to node objects as input and output. The method may include modifying the network and accessing the network.

Embodiments may include assigning one or more units to an element of a spreadsheet or other application for the processing and presentation of information. The units may consist of units of measurement. Embodiments may include performing calculations with the element. The calculations may include type-checking values of the element.

Embodiments may include performing operations in response to commands entered through a user interface. The operations may include creating an object within the application. The creating may include assigning a name to the object and specifying a set of parameters for the object. The operations may also include assigning properties to the object by evaluating an expression entered through the text-based interface which contains the name of the object. The operations may include accessing properties of the object.

While specific embodiments will be described below with reference to particular circuit or logic configurations, those of skill in the art will realize that embodiments of the present invention may advantageously be implemented with other substantially equivalent configurations.

Figure 1:
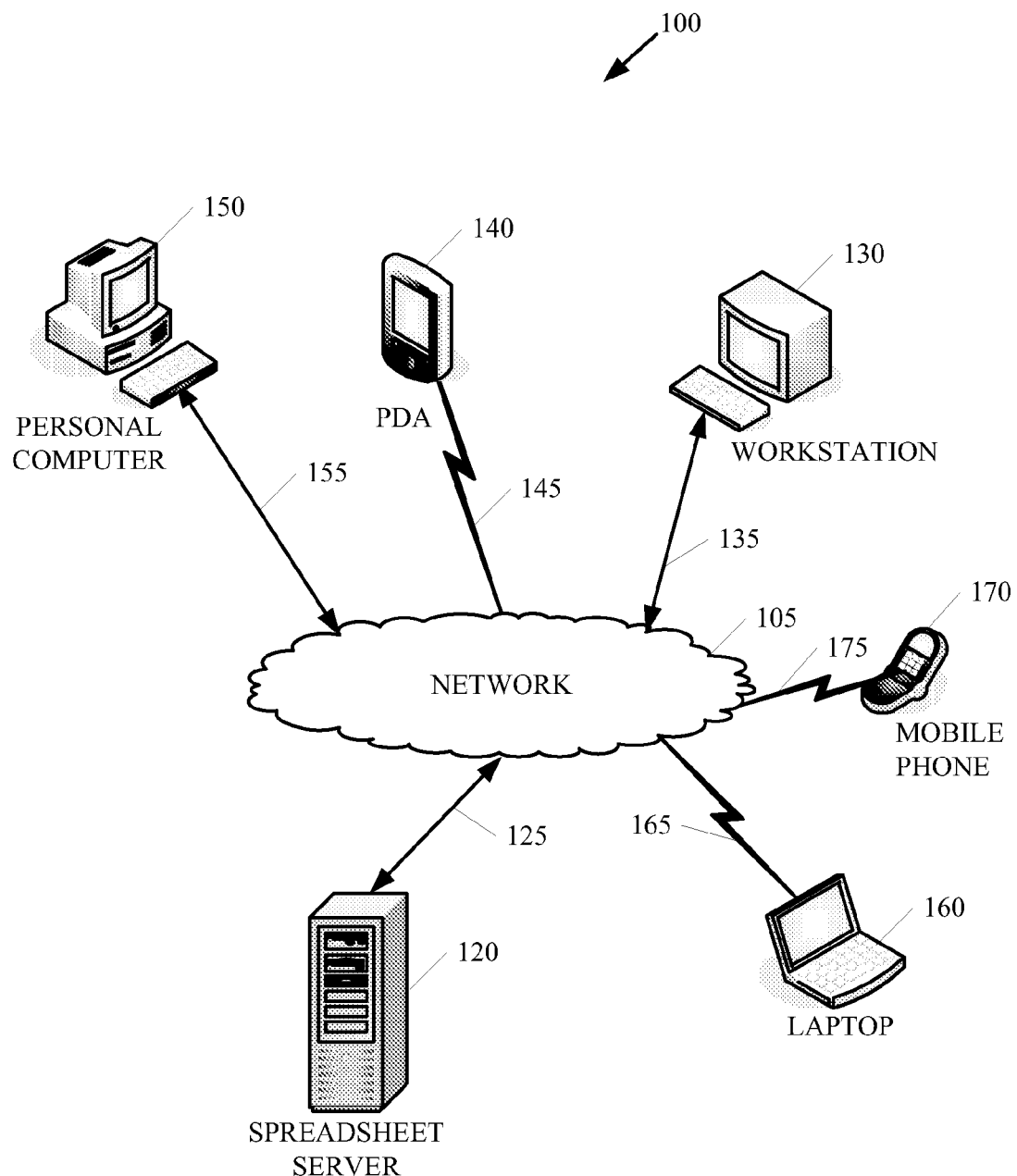
FIG. 1 is a network diagram of an embodiment of devices to perform spreadsheet operations.

FIG. 1 depicts a diagram of an embodiment of a networked system 100 of devices capable of executing spreadsheet programs. The spreadsheets may be improved in accordance with embodiments of the invention. The system 100 includes a network 105, spreadsheet server 120 connected to network 105 through wireline connection 125, and a variety of devices capable of executing spreadsheet programs, including:

- workstation 130, a computer coupled to network 105 through wireline connection 135,
- personal digital assistant 140, coupled to network 105 through wireless connection 145,
- personal computer 150, coupled to network 105 through wireline connection 155,
- laptop computer 160, coupled to network 105 through wireless connection 165; and
- mobile phone 170, coupled to network 105 through wireless connection 175.

The devices 130, 140, 150, 160, and 170 may execute spreadsheet programs. A spreadsheet is a program that may perform calculations. A spreadsheet may provide a user with access to cells, or storage locations for data, arranged in rows and columns. A user may refer to a cell by the row and column. For example, if columns are labeled by numbers and rows are labeled by letters, A:4 may refer to a cell in the first row and fourth column. Cells may contain text, numbers, or formulas. Values may be entered directly into cells by a user or produced by application of a formula. Some spreadsheets provide for automatic recalculation. If the value of one cell is based on the value of one or more other cells, and their value is changed, the value of the first cell may be automatically updated.

In some embodiments, some of the devices 130, 140, 150, 160, and 170 may execute local spreadsheet programs. In many embodiments, some of the devices 130, 140, 150, 160, and 170 may execute spreadsheet programs through spreadsheet server 120. These devices may communicate with spreadsheet server 120 through client software, a web browser, or other methods of communication which may be known to those of skill in the art. Spreadsheet server 120 may receive input through these devices, perform spreadsheet calculations and other spreadsheet operations, and transmit the results to the devices.

In several embodiments, some of the devices 130, 140, 150, 160, and 170 may also access external data through network 105. They may, for example, access external sources of data such as data bases or workbooks on other spreadsheets. In a few embodiments, they may access functions through network 105. In further embodiments, applications on some of the devices may provide for functions available over the internet. The specification of an internet function may provide for parameters such as the number and type of arguments, the type of result, a URL at which to access the function. In some embodiments, some functions may be built into an application. The user supplies values for the arguments, and the application executes the function, providing the result. In other embodiments, a user may define an internet function by supplying the parameters. In a few embodiments, some of the devices 130, 140, 150, 160, and 170 may access internet functions through spreadsheet server 120.

Network 105, which may consist of the Internet or another wide area network, a local area network, or a combination of networks, may provide data communications among spreadsheet server 120 and the devices 130, 140, 150, 160, and 170.

The arrangement of spreadsheet server 120 and other devices making up the exemplary system illustrated in FIG. 1 is for explanation, not for limitation. Data processing systems useful according to various embodiments of the present invention may omit a server, or may include additional servers, routers, other devices, and peer-to-peer architectures, not shown in FIG. 1, as will occur to those of skill in the art. In some embodiments, a device capable of executing spreadsheet programs may not be connected to a network at all. In some embodiments, a device capable of executing spreadsheet programs may not be connected to a network at all. In other embodiments of the invention, a device such as one of the devices 130, 140, 150, 160, and 170 may run applications to process and present information other than spreadsheets.

Networks in such data processing systems may support many data communications protocols, including for example TCP (Transmission Control Protocol), IP (Internet Protocol), HTTP (HyperText Transfer Protocol), WAP (Wireless Access Protocol), HDTP (Handheld Device Transport Protocol), and others as will occur to those of skill in the art. Various embodiments of the present invention may be implemented on a variety of hardware platforms in addition to those illustrated in FIG. 1.

Figure 2:
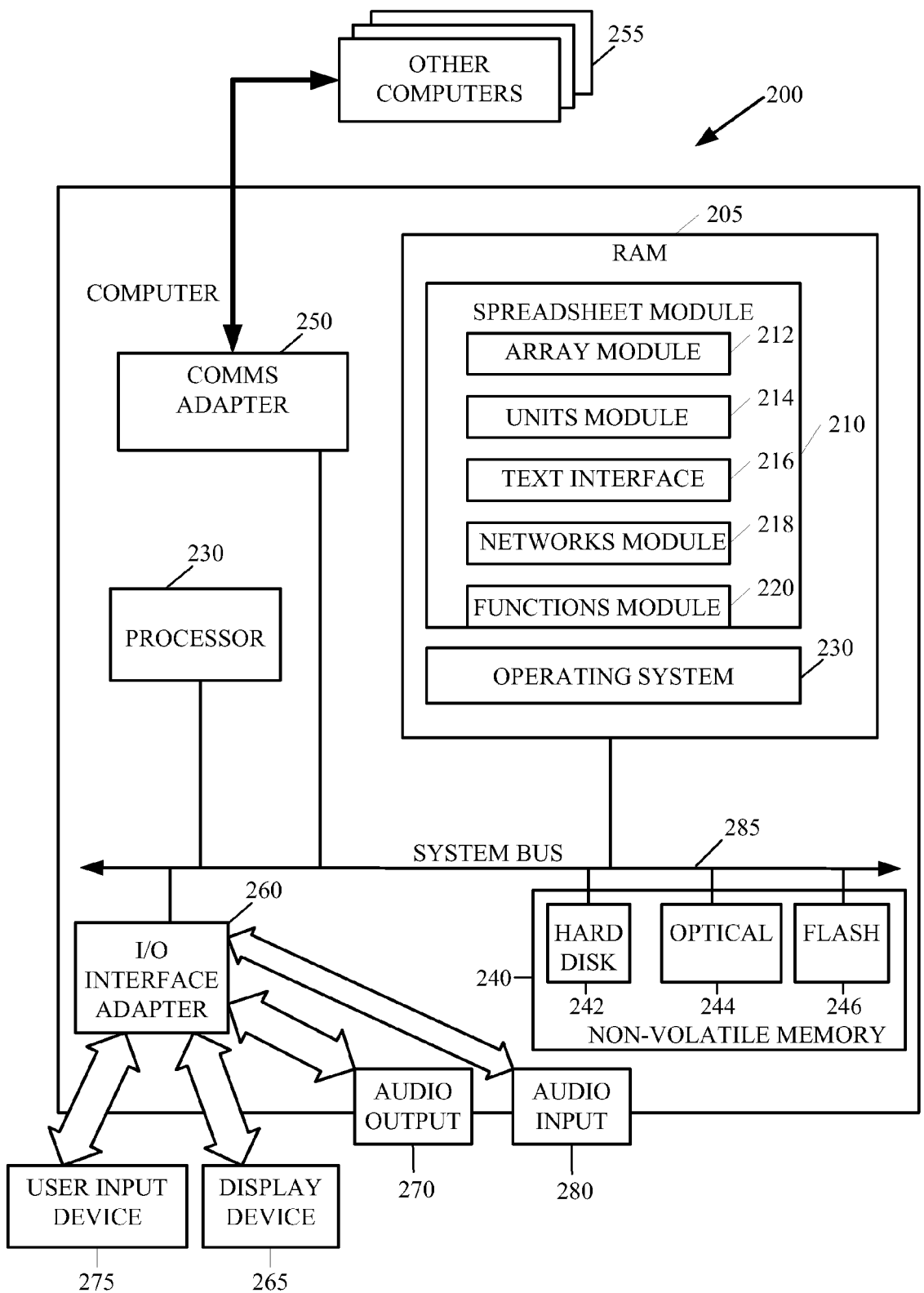
FIG. 2 depicts an embodiment of a computer capable of executing spreadsheet programs.

Turning to FIG. 2, depicted is an embodiment of a computer 200 capable of executing spreadsheet programs and other applications to process and present information that includes random access memory (RAM) 205, a processor 230 or CPU, non-volatile memory 240, a communications adapter 250, and an Input/Output (I/O) interface adapter 260 connected by system bus 285. Stored in RAM 205 is spreadsheet module 210 and operating system 230.

Spreadsheet module 210 may comprise computer program instructions for performing spreadsheet operations. Spreadsheet module 210 includes array module 212, units module 214, command interface module 216, networks module 218, and functions module 220. Array module 212 may perform operations related to multidimensional arrays. Units module 214 may perform operations with units, such as units of measurement. Command interface module 216 may accept text input from a user. Networks module 218 may perform operations upon networks, such as flow networks. Functions module 220 may perform functional operations, such as integration and differentiation. The modules shown in spreadsheet module 210 are for explanation, not for limitation. In other embodiments, a spreadsheet module may contain additional modules, may omit some of the modules shown in FIG. 2, or may combine some of the modules shown in FIG. 2.

Operating system 230 may comprise UNIX™, Linux™, Microsoft Windows™, AIX™, or other operating systems useful for auto-completion programs as will occur to those of skill in the art. Spreadsheet module 210 and operating system 230 (components of software) are shown in RAM 205 in FIG. 2, but many components of such software may be stored in non-volatile memory 240 also. Further, while the components of such are shown simultaneously present in RAM, in some other embodiments, only some of the components of RAM 205 may be present at any given time.

Non-volatile computer memory 240 may be implemented as a hard disk drive 242, optical disk drive 244, electrically erasable programmable read-only memory space (EEPROM or Flash memory) 246, RAM drives (not shown), or as any other kind of computer memory as will occur to those of skill in the art. Communications adapter 250 may implement the hardware level of data communications through which one computer sends data communications to other computers, such as other computers 255, directly or through a network. The data communications may include communications between a spreadsheet server and computer 200. Such data communications may be carried out serially through RS-232 connections, through external buses such as USB, through data communications networks such as IP networks, and in other ways as will occur to those of skill in the art. Examples of communications adapters include modems for wired dial-up communications, Ethernet (IEEE 802.3) adapters for wired network communications, 802.11a/b/g/n adapters for wireless network communications, and mobile broadband cards.

I/O interface adapter 260 implements user-oriented I/O through, for example, software drivers and computer hardware for controlling output to display devices such as display device 265 and audio output device 270 as well as user input from user input device 275 and audio input device 280. User input device 275 may include both a keyboard and a mouse. Some embodiments may include other user input devices such as speech interpreters, bar code scanners, text scanners, tablets, touch screens, and/or other forms of user input devices. Audio output 270 may include speakers or headphones and audio input device 280 may include a microphone or other device to capture sound.

The computer and components illustrated in FIG. 2 are for explanation, not for limitation. In other embodiments, embedded systems, PDAs, cell phones, BlackBerries® and other devices may perform spreadsheet operations. In other embodiments, modules to perform spreadsheet operations may be implemented in hardware, firmware, or in state machines or may form a component of an operating system. In several embodiments, a computing device may contain two or more processors. In various embodiments, a computing device may use point-to-point interconnects to connect processors or to connect a processor and another element of the computing system.

Figure 3:
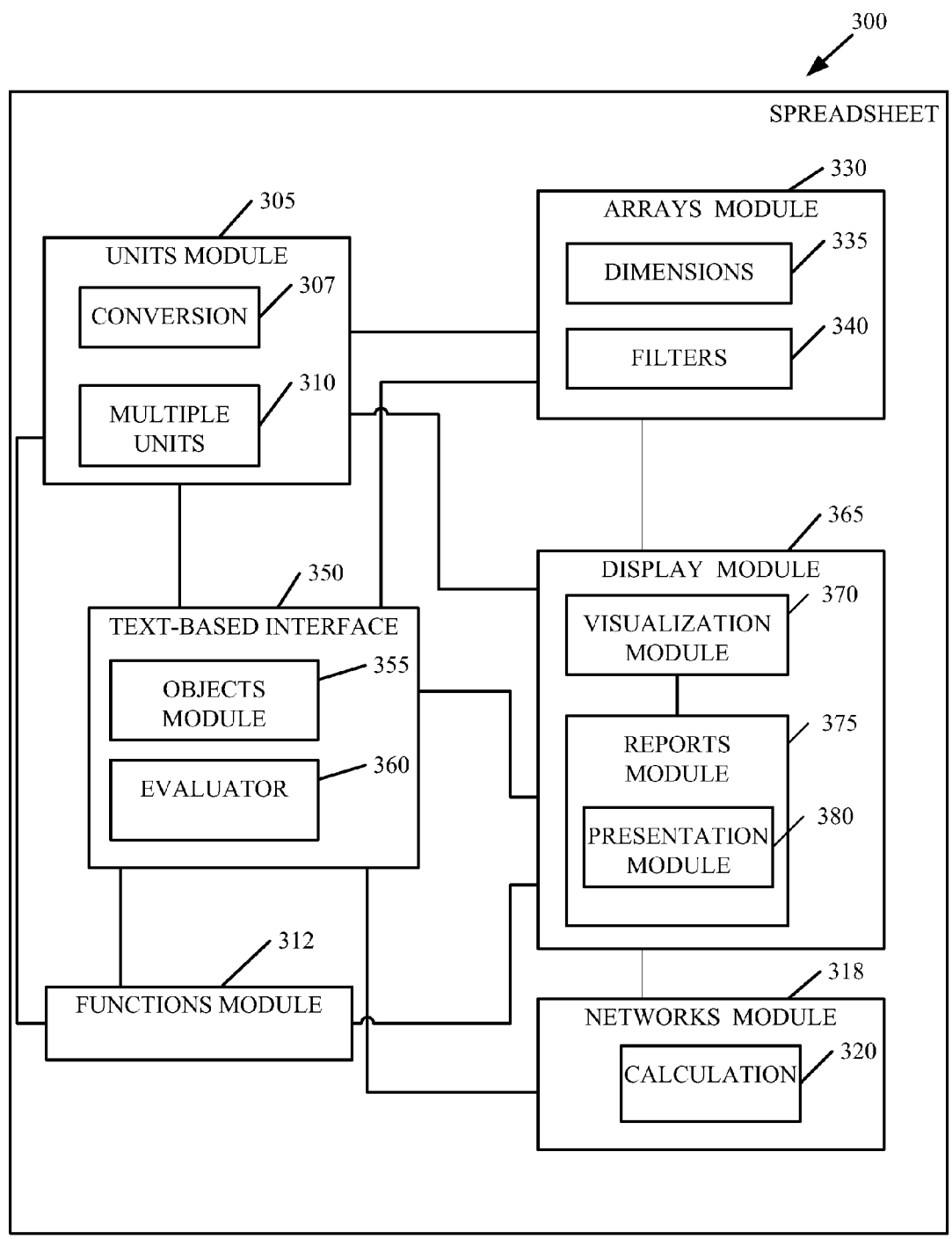
FIG. 3 depicts an embodiment of a spreadsheet apparatus.

FIG. 3 illustrates an embodiment of a spreadsheet module 300 that includes units module 305, functions module 312, networks module 318, arrays module 330, text-based interface module 350, and display module 365. Units module 305 may assign units to elements of a spreadsheet and may perform operations with the elements with assigned units (unitized elements). The units may include units of measurement, such as units of time, distance, weight, mass, power, current, or other units. Units may also include text and other labels, such as i, the square root of −1. The unitized elements may include cells of a spreadsheet, elements of an array or other complex spreadsheet structure, and arguments of a function.

The operations performed by units module 305 may include calculations with unitized elements as arguments. For example, units module 305 may add 3 ft and 5 ft to obtain 8 ft, or multiple 4 days by 3 to obtain 12 days. Similarly, units module 305 may multiply 3 ft by 5 ft to obtain 15 sq ft. The operations may also include type-checking. The type-checking may include whether the contents of cells are of specified units. In addition, type-checking may extend to the arguments of functions. For example, a function for area may be defined by $$\text{Area}(x \text{ ft}, y \text{ ft}) = z$$

In the above example, units module 305 may signal an error if the arguments supplied to the area function are not unitized or have measurements other than length. In many embodiments, a units module may assign units to the results of functions based upon the units of the arguments. The output of the above function, for example, may have units of square feet.

Units module 305 includes conversion module 307 and multiple units module 310. Conversion module 307 may convert between compatible units, such as units of length or units of time. For example, if an element e is assigned the unit of feet, and is provided a value in miles, conversion module 307 may multiply the value by 5280 to convert to feet.

Multiple units module 310 may perform operations with elements with multiple units or with one or more units and a non-unitized value. The elements may be represented as a sum of values with incompatible units, or a sum of a non-unitized value and values with incompatible units. For example, multiple units module 310 may perform operations with elements such 10 hrs+3 ft, or 1+2 ft+3 dollars. Such elements may provide convenient storage for multiple values. In some embodiments, multiple units module 310 may represent complex numbers as a+bi, where i is the square root of −1. Multiple units module 310 may then perform operations with complex numbers, such as addition, subtraction, multiplication, division, and norm or absolute value. In further embodiments, multiple units module 310 may solve equations involving complex numbers, such as algebraic equations with complex coordinates.

Functions module 312 may perform operations with functions. In some embodiments, functions module 312 may enable a user to create, store, name, and define functions. The user may then reference the function by name in an expression, such as an expression entered into command interface 350. As a result, the function may be applied to a set of values for its arguments to produce a result. For example, a user may define a function with the expression:

$$F(x,y) = 3*x + 4*y + 5.$$

The user may then enter the expression F (A: 5, G: 7), and worksheet 300 may apply function F to the values of the cells A: 5 and G: 7.

In some embodiments, functions module 312 may perform operations with unitized functions. Some or all of the arguments or the output of a unitized function may be unitized. The function described above, Area (x ft, y ft)=z, is a unitized function. Both its arguments and output may be assigned units.

In many embodiments, functions module 312 may perform operations from calculus. In some further embodiments, functions module 312 may calculate the derivative of a differentiable function at a point. The user may specify the function and the point. In other further embodiments, functions module 312 may calculate the definite integral of a function. The definite integral of a real-valued function is the integral from a first point to a second point, $$\int_{x=a}^{x=b} f(x)\,dx.$$

Functions module 312 may perform the operations by Monte Carlo methods, by tables, by approximation by Riemannian sums, or by other methods known to those of skill in the arts.

Networks module 318 may perform operations involving networks, such as flow networks or artificial neural networks. Networks module may create, store, and access network objects, which may represent networks. A network may represent the production of a factory, the flow of a material through pipelines, or the operation of an artificial neural network. A network object may include nodes and flow objects. A node object may have zero or more design parameters. The parameters may influence the operation of the node. The parameters may, for example, describe the processing capability of the node or the output of the node. A node object may also have zero or more state parameters which reflect the state of the node. For example, a state parameter of a station at a manufacturing plant may represent the particular product or products currently being produced at the station. The parameters, both design and state, may be either numeric or non-numeric.

Nodes may receive input through flow objects and send output through flow objects. A flow object may have zero or more design parameters. The parameters may influence the operation of the flow object. The parameters may, for express, describe the maximum flow rate through the flow object. A flow object may also have zero or more state parameters which reflect the state of the flow object. For example, a state parameter of a pipe may represent the current pressure drop in the pipe.

Recursion may be permitted in a network. For example, flow may be circular. A network may contain a tree as a sub network. A tree is non-recursive.

Arrays module 330 may perform operations with arrays. An array may contain a set of values or elements. Elements of arrays may be referenced by a list of coordinates. The number of dimensions of the array is equal to the size of the list. The size of a dimension of an array is the number of distinct values for the coordinate of the dimension. For example, elements of a three dimensional array may be referenced by a list of three coordinates. A 10 by 25 by 25 array has dimensions of sizes 10, 25, and 25. One set of coordinates for the array may be the numbers from 1 to 10, the numbers from 1 to 25, and the numbers from 1 to 25. Thus, elements of the array may be addressed by coordinates such as (1, 5, 8) or (7, 4, 2). In some embodiments, arrays module 330 may enable the creation of named array objects. For example, a user may define A as a 10 by 25 by 25 array. The three dimensions of array A have sizes 10, 25, and 25 respectively.

Arrays module 330 may provide for the creation of objects of type array. The creation of an array may result in the specification of a name for the array and a specification of the number and sizes of its dimensions. The values of the elements of an array may be input by a user, created by formula, or imported from other data sources. For example, arrays module 330 may import into an array specified values from a database. In some embodiments, an array may be linked to another data source, such as an array in a different worksheet or a table in a data base. As a result of the linking, in further embodiments, updating the data source may automatically update the array. A data structure in a workbook representing a link between an array in the workbook and an array in another workbook may specify the filename of the other workbook and the name of the array in the other workbook, such as:

Filename: c:\otherfile.xls
Object: OtherSales

As objects of spreadsheet 300, arrays may be referred to by name in expressions, such as expressions entered into text-based interface 350, and in formulas.

In further embodiments, arrays module 330 may perform array calculations. For example, in some embodiments, arrays module 330 may calculate the array product A×B, where A and B have suitable dimensions. In the two dimensional case, the product of two arrays A and B to form the array C may be expressed by the formula $$C_{i,j} = \sum_{k=1}^{n} A_{i,k} \times B_{k,j}$$

In this example, the array A has n columns and the array B has n rows. The element of array C in the ith row and jth column is obtained by multiplying each element in the ith row of A by the corresponding element in the jth column of array B, and summing all of the products. Similarly, in some embodiments, arrays module 330 may calculate the sum of two arrays, the inverse of an array, or the transpose of an array. In addition, if A is an array and v is a vector, both with suitable dimensions, arrays module 330 may calculate A (v), the result of applying the transformation represented by A to the vector v.

In several embodiments, arrays module 330 may multiply corresponding entries of two matrices to produce another array. For example, a three-dimensional array may represent sales volume of items by salesman and year. Another three-dimensional array may represent the sales price of items by salesman and year. The product of corresponding elements of the two arrays may produce an array representing the dollar value of sales of items by salesman and year. These descriptions of matrix operations are for illustration and not limitation. In other embodiments, spreadsheets may perform matrix operations as known by those of skill in the art.

Arrays module 330 may also modify the values of elements of an array. Arrays module 330 may display the values of the elements of the array as cells in a spreadsheet. Arrays module 330 includes dimensions module 335, and filters module 340. Dimensions module 335 may create and perform operations with dimension objects. A dimension object may consist of a one-dimensional list of items which may be text or numerical, including units, such as units of measurement. In some embodiments, the elements may be ordered. A function to return the elements may list the elements in order. In many embodiments, the element names may be unique. In those embodiments, a dimension would not contain two elements with the same name.

In some embodiments, elements of dimension objects may serve as coordinates for arrays. Turning to FIG. 4, depicted is an example of operating with multi-dimensional arrays and dimensions in an embodiment of the invention. FIG. 4 includes worksheet 400. Worksheet 400 consists of a rectangular arrangement of small vertical boxes or cells, such as cell 405. In many spreadsheets, a cell may hold a single value or a formula. Cell 405 contains the value 20.9. The cells may be arranged in rows and columns. In the embodiment of FIG. 4, columns are labeled by letters. For example, column 410 is labeled with the letter "H." Similarly, in the embodiment of FIG. 4, rows are labeled with numbers. For example, row 415 is labeled with the number 2. Cells may be designated by their row and column. For example, cell 405 may be designated as "E16" or "E:16."

Worksheet 400 includes dimensions 420, 425, and 430 and array 440. Each of the dimensions (colors 420, cars 425, and countries 430) has three elements. Array 440 is based upon the three dimensions 420, 425, and 430. In the example of FIG. 4, the coordinates of array 440 consist of elements of the three dimensions. Elements of array 440 may be referenced by specifying an element of each dimension. For example, the element of array 440 represented by cell 405 may be referenced by the color red, the car Ford and the country Mexico. In some embodiments, the reference to the element of the array may be expressed by a formula such as Sales#Mexico,#Ford,#red.

In the example of array 440, each specification of one element from each of the dimensions 420, 425, and 430 refers to a unique element of array 440. Conversely, for each element of array 440, there is one specification of one element from each of the dimensions 420, 425, and 430 which refers to the element.

Columns B through J of Rows 12 and 13 contain the elements of the Cars and Colors dimension applicable to the array elements displayed in those columns. For example, column B contains elements of array 440 which may be referenced by a car value of Chevy and a color value of red. Column A of rows 14 through 16 contains the country applicable to the array elements of those rows. The cells of row 14 contain elements of the array with country coordinate equal to USA, row 15 contains elements of the array with country coordinate equal to Canada, and row 16 contains elements of the array with country coordinate equal to Mexico.

In some embodiments, the use of dimensions in connection with arrays may simplify the referencing of elements of an array. Dimensions may enable the referencing to be based upon attributes of the element easily accessible to a user. In the above example, the attributes were the country of sale, the type of car, and the color of the car. In contrast, a traditional reference to an element of an array might be by a formula such as Sales_array[3, 2, 1]. In order to compose this formula, a user would have to know that the first coordinate refers to the country, the second coordinate refers to the car, and the third coordinate refers to the color. In addition, the user would have to know that the third country was Mexico, the second car was Ford, and the first color was red. In some embodiments, the reference to a portion of an array may be through a function expression which may include references to the dimensions and elements specified. For example, an expression to access the Sales array could also be of the form: Sales[DimOfElement(Countries, "Mexico"), DimOfElement(Colors, "Red", "Green")]

In a few embodiments, the dimensions assigned to arrays linked to external data sources may be based upon fields of the external data sources. For example, a sales table in a data base may have as fields salesman, year, and product. A sales array in a spreadsheet linked to the sales table may be based upon dimensions salesman, year, and product. Elements of the dimensions may correspond to entries of the fields. The elements of the salesman dimension may correspond to the salesmen listed in the salesman field, the elements of the years dimension may correspond to the entries in the year field, and the elements of the product dimension may correspond to the entries in the product field. The correspondence need not be complete. Entries in the data base fields may, for example, be deleted. As a result, the array may correspond to a portion of the data base table.

FIG. 4 is for illustration and not for limitation. In embodiments of the invention, arrays of dimensions other than 3 may be processed. In embodiments of the invention, the elements of the array may be displayed differently on a spreadsheet. For example, the dimensions may appear on a different page than the elements of the array, or the elements of the array may be contained in cells that appear on multiple pages. The display may omit the captions to indicate the dimensions associated with elements or may indicate the association between array elements and dimensions in other ways.

In other embodiments of the invention, arrays may be implemented without the use of dimensions. In further embodiments, the elements of an array may consist of compound objects rather than simple objects such as numbers or words. For example, in some embodiments, an array may constitute an array of subarrays. The top-level array may, for example, be based upon a single dimension. For each element of the dimension, the corresponding element of the array may constitute a subarray. In turn, elements of a subarray may themselves constitute arrays, which are subarrays of the subarray. Subarrays may be based upon different dimensions. A subarray may have a specific set of display properties and units associated with it. The display properties of the subarrays may enable them to be lined up vertically (the contents of one subarray displayed above the contents of another) or horizontally (the contents of one subarray displayed in a horizontal row with the contents of another). This mechanism may enable the use of varying array structures within a single parent array.

The following table illustrates the use of subarrays:

| Array StoreProfile | | | | |
|---|---|---|---|---|
| ProfileItem | | | | |
| Inventory | | | Section | |
| | FoodItem | | Aisles | Checkouts |
| | Fruits | | 30 | 6 |
| | Snacks | | 12 | 2 |
| | Candy | | 100 | 4 |
| Sales | SalesRep | | | |
| | Joe | | 10 | |
| | Tom | | 15 | |
| | Mary | | 18 | |
| | Fred | | 7 | |
| Address | 12345 Main Street | | | |

StoreProfile is a top-level array based on the single dimension, ProfileItem, which contains 3 elements, address, sales, and inventory. StoreProfile[#Address] returns a scalar with an address. StoreProfile[#Sales] returns a one-dimensional array with four elements, based upon the dimension SalesRep. StoreProfile[#Inventory] returns two-dimensional array based upon the dimensions FoodItem (3 elements) and Section (2 elements).

The above table is for illustration and not limitation. In other examples, a top-level array may be multidimensional, and its elements may themselves have subarrays. In addition, the top-level array may be displayed in a spreadsheet or other application as may occur to those of skill in the art.

In some embodiments, the dimensions module may maintain histories of changes and maps from one change to the next. This history could be used to resolve updates to dependent objects, such as arrays, where the update could not be performed at the time the dimensions were updated. Changes to arrays, for example, may involve changing the dimensions on which they are based. The changes may include mapping one dimension to another, adding elements to a dimension, removing elements from a dimension, or renaming the elements. In the Salesperson dimension, for example, salespeople could be added or removed, or their names could be changed. Similarly, the Salesperson dimension may represent the staff of an entire business, and a Store_525_salesperson dimension may represent the salespeople at a particular store. The elements of the Store_525_salesperson dimension may be mapped to elements of the Salesperson dimension, but the mapping may not include some of the elements of the Salesperson dimension. A mapping from one dimension to another may map an element with one name in one dimension to an element with another name in another dimension. For example, one dimension may contain product names and another may contain SKU (stock keeping unit) codes. The relationships illustrated by the above mappings, where at most one element of one dimension is mapped to an element of another dimension, are called filter relationships.

In another kind of mapping between dimensions, an element of one dimension may be mapped to multiple elements of another dimension. The correspondence may indicate a category/subcategory or hierarchical relationship. For example, one dimension may contain two elements, Foreign and Domestic. Foreign may map to the dimension Foreign-countries, which contains two elements, Mexico, and Canada. Domestic may be mapped to Domestic_countries, which includes US. Similarly, one dimension may list states and another cities. For each state, there may be a dimension, cities_of_state, with several elements.

A history of changes may be used when arrays in different workbooks are linked, and only one is open at the time of change. The history may be used to update the other array when the workbook containing it is opened. If both workbooks were opened, a change made to one of the arrays may be automatically propagated to the other array, so that the use of the history of the change may not be necessary to update the other array. Similarly, a history of changes may be useful when the changes are not successfully resolved. For example, a change to dimensions may render an array too large to display properly. A user may be able to modify the display parameters of the array and apply the change history, thereby displaying the array as changed without having to manually redo the changes.

In a few embodiments, dimensions and arrays may be used to facilitate statistical methods. The dimensions and arrays may contain data representing cumulative probability distributions or representing the parameters used for a cumulative probability function. For example, a dimension with cumulative probability parameters could contain an element "mean" and an element "standard deviation," the elements referring to elements of an array containing those values. Similarly, a dimension used for cumulative probability distributions may contain the elements 0, 0.10, 0.20, 0.30 . . . 1. Array elements corresponding to dimension elements may contain the value of a cumulative probability distribution up to the point designated by a dimension element.

In many embodiments, a dimension may also contain a list of units. In further embodiments, dimensions module 335 may assign the units of a dimension object to elements of an array. Dimensions may be assigned parent/child relationships to other dimensions, creating a relational structure for use in processing arrays, generating graphs, or other uses. For example, the elements of the parent dimension "Country" may have relationships to their individual children in the dimension "States". The elements of the dimension "States", in turn, may have child dimensions consisting of cities elements.

Returning to FIG. 3, filters module 340 may perform operations with filters. A filter is a type of dimension object that references an element or elements of zero, one, or more other dimensions. In some embodiments, filters module 340 may create named filters. In further embodiments, the creation may result from the execution of an expression entered by a user. The expression may specify the filter creation operation to be performed and may provide parameters describing the filter.

Figure 5:
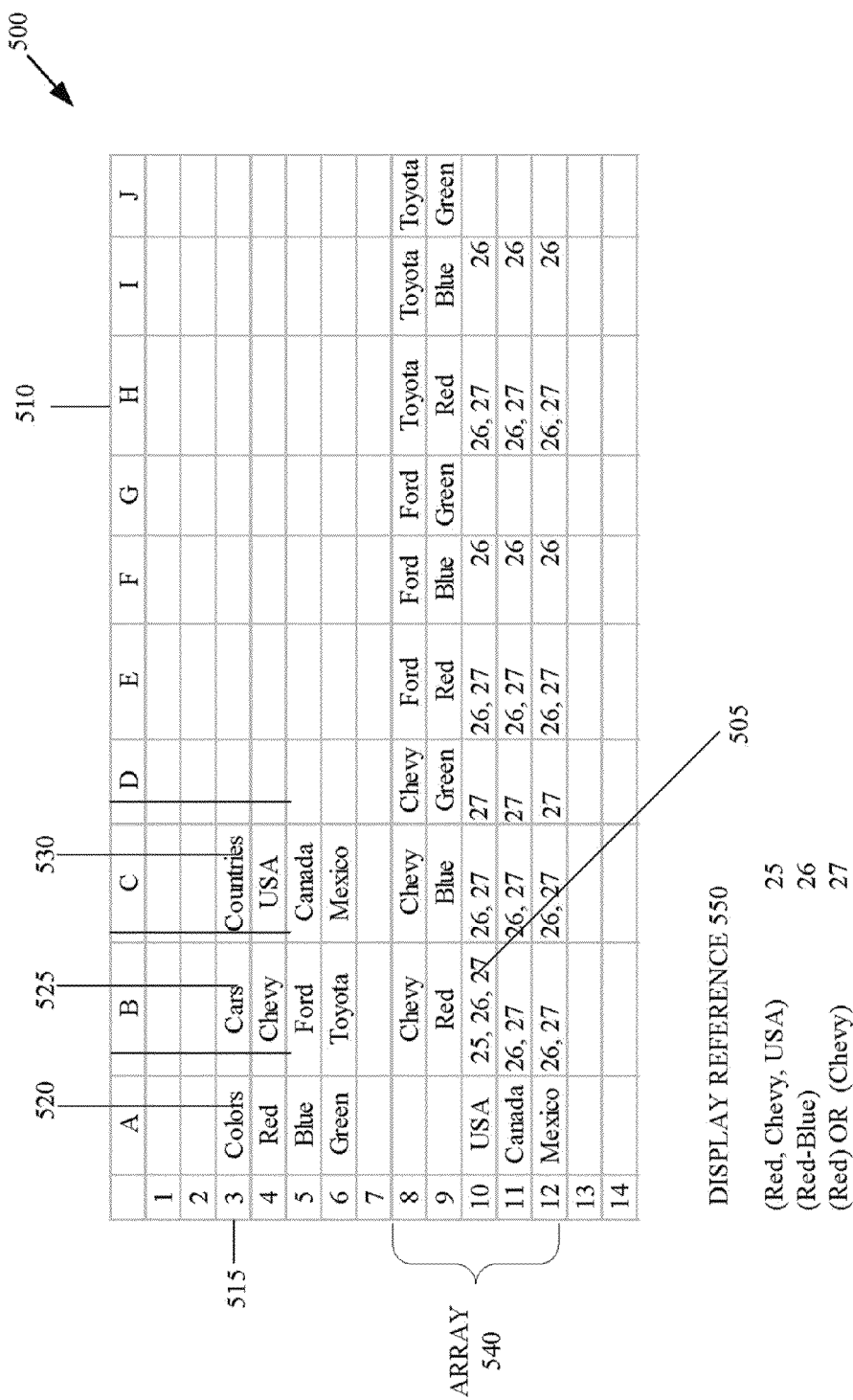
FIG. 5 depicts an exemplary worksheet with dimensions, filters, and an array.

Filters module 340 may also apply filters to arrays to designate particular elements, the elements of an array with coordinate elements matching the dimension elements referred to by the filter. FIG. 5 illustrates the use of filters to reference elements of an array. FIG. 5 includes worksheet 500 and display reference 550. Worksheet 500 is similar to worksheet 400 of FIG. 4. It includes the dimensions colors 520, cars 525, and countries 530, and a three-dimensional array 540 based upon the dimensions. In the example of FIG. 5, the cells of array 540 contain entries indicating filters referencing the cells, rather than the actual values of the elements of the array. For instance, cell 505 is referenced by filters 25, 26, and 27 of display reference 550.

A filter referencing elements of an array may specify an element of a dimension on which the array is based. For example, the filter (Color, "Red") may reference elements of array 540 whose color is red. In worksheet 500, those elements are the elements of array 540 in columns B, E, and H. More complicated filters may reference elements of multiple dimensions. Filter 25 includes one element from each of the dimensions on which array 540 is based, "Red" from Colors 520, "Chevy" from Cars 525, and "USA" from Countries 530. Filter 25 references only one element of array 540, the element in cell B:10. Filter 26 includes a range of elements, the colors from red to blue. Filter 27 illustrates a Boolean combination of filters. Two primitive filters are combined with the Boolean operator OR. Filter 27 references all elements referenced either with the value "Blue" for color or the value "Chevy" for car. In further embodiments, filters may combine other logical operations. If f1 and f2 are filters, then f1 AND f2, f1 XOR f2, and NOT f1 may also be filters. For example, the filter f1 AND f2 designates an element e in array A only if both f1 and f2 designate e. Similarly, f1 XOR f2 selects an element e in array A only if f1 and f2 produced the opposite result on e—one selected e and the other excluded e. Filters may also make use of the predicate IsSubsetOf. IsSubsetOf (S1, S2) may be true when S1 is a subset of S2.

In many embodiments, a filter may itself be a dimension, whose elements are the filter's references to the elements of other dimensions. In further embodiments, a filter dimension may be used as a dimension of an array. In the example of FIG. 5, the dimension Domestic_cars, a filter dimension of Cars 525, may include Chevy and Ford. Domestic_cars may be used along with Colors and Countries to create a sales array limited to sales of domestic cars. This sales array would be a sub array of array 540. As subsequent figures illustrate, filters and dimensions may serve other uses, such as designating edges and subarrays of arrays (see FIG. 4), axes in graphs (see FIG. 7), and the subject of pages in reports (see FIG. 8).

In further embodiments, a spreadsheet may resolve references to elements of arrays, such as filter references, by listing the cells containing the values of the elements. For example, the filter (Mexico) refers to the contents of cells B:12 through I:12. An application of this filter in a formula, for example, may result in those cells being displayed in the cell containing the formula. For contiguous cells, a notation such as (A1: A10) might suffice. For non-contiguous cells, the display may consist of a list separated by commas.

The example of FIG. 5 is for illustration and not limitation. In some embodiments, a filter for an array must contain an entry for each dimension. In these embodiments, (Red) would not be permitted, but (Red, Chevy, Mexico) would be. In further embodiments, some of the values may be empty. Thus, (#Red, #Mexico) would be permissible. In many embodiments, multiple entries could be permitted for some of the dimensions. For example, the filter (#Red, {#Chevy, #Ford}, #Mexico) may reference an element of the array with either a Chevy or a Ford in the Cars dimension. In some embodiments, the references to dimensions may be in any order. Thus, both (#Red, #Chevy, #Mexico) and (#Chevy, #Red, #Mexico) would be permissible. As the elements of the filters may refer to specific elements of specific dimensions, the dimension referred to may be inferred by the filter, and a specific ordering of references may not be required. In other embodiments, the dimensions may be ordered, and the references to elements in filters may be required to follow the same order. In still further embodiments, a filter may be permitted to have zero elements (the empty filter). In these embodiments, the empty filter applied to an array may reference all of the elements of the array.

Figure 7:
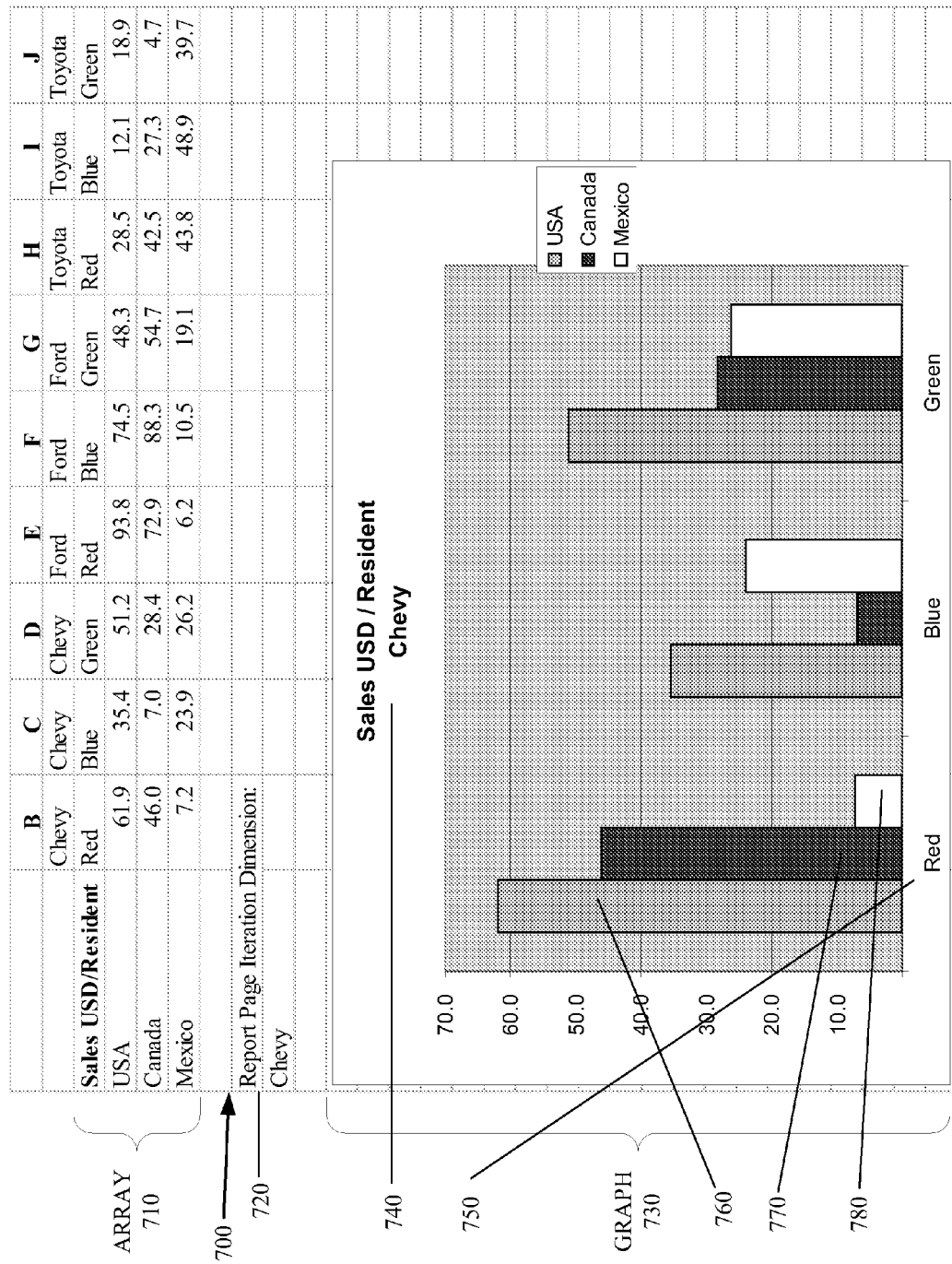
FIG. 7 depicts an exemplary worksheet showing a graph based upon dimensions.
Figure 8:
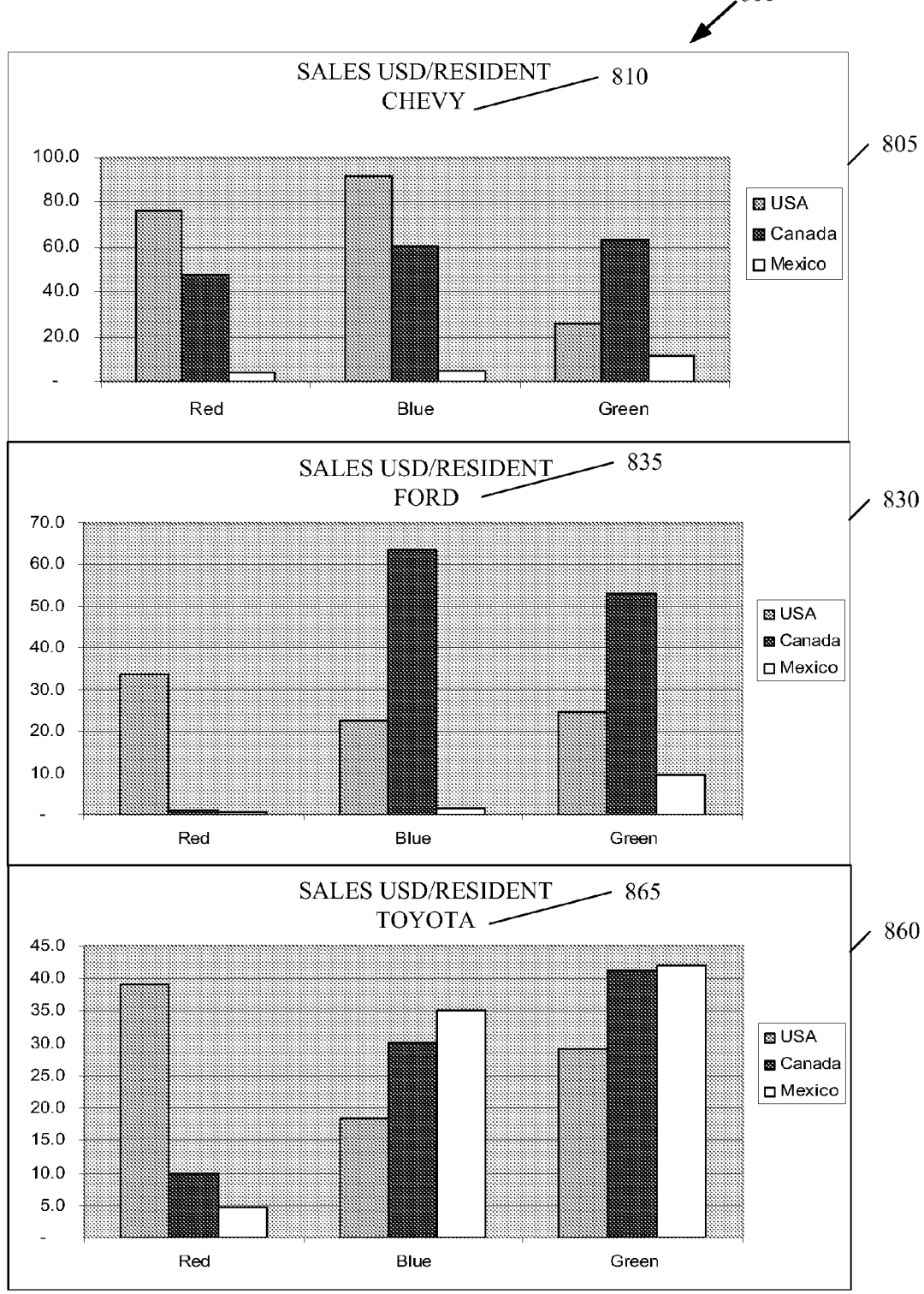
FIG. 8 depicts an exemplary worksheet showing a report based upon dimensions.

In some embodiments, the provision of filters as a type of object, and the use of filters as a parameter in functions and other operations, may make working with data easier for a user. The user may, for example, create an expression involving a filter for performing an operation on data. The user may then be able to execute the expression repeatedly as data is changed, rather than manually reentering a specification of the data. Similarly, the user may create an expression involving a filter for performing an operation. By changing the filter, the user easily may perform the operation on different sets of data. FIGS. 7 and 8 provide examples of graphical output that may be produced through the use of filters.

Returning to FIG. 3, text-based interface module 350 provides an interface for spreadsheet operations. The interface may be a text-based interface, a graphical user interface (GUI), or a combination of both. The spreadsheet operations commanded by a user through the text-based interface module 350 may include the operations performed by units module 305, functions module 312, arrays module 330, network module 318, and display module 365.

Text-based interface module 350 includes objects module 355 and evaluator 360. Objects module 355 may perform operations with spreadsheet objects. The objects may include creating named objects, assigning properties to the objects, applying the objects, modifying the objects, and accessing the objects. In some embodiments, an object might be created by entering a name of the object, an operator to indicate creation (such as "="), and a set of properties for the object. A similar notation may be used to assign properties to an object, such as a formula for computing a function.

Evaluator 360 may evaluate expressions. In many embodiments, the result may be entered into the active cell of a spreadsheet. In a few embodiments, the result may be displayed in the command interface. In some embodiments, evaluator 360 may evaluate expressions similar to those entered into a calculator. In those embodiments, command interface 350 may incorporate the features of a calculator in a spreadsheet.

Figure 6:
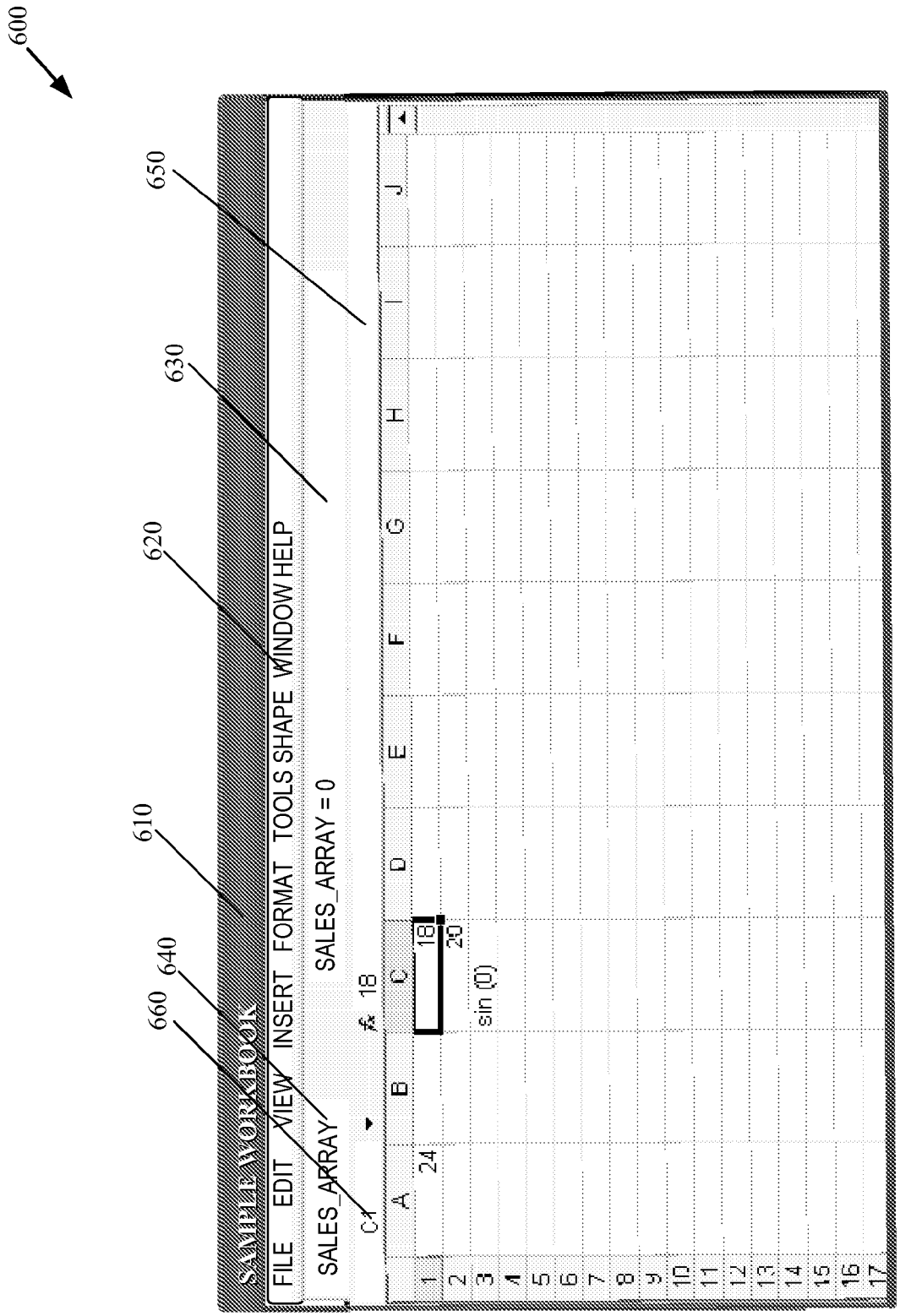
FIG. 6 depicts an exemplary text-based interface for a spreadsheet.

Turning to FIG. 6, illustrated is an example worksheet 600 for a spreadsheet which contains a text-based interface such as text-based interface 350 of FIG. 3. Worksheet 600 includes standard features such as title bar 610 and menu bar 620. Text-box 630 provides a text-based interface for commands relating to objects, such as commands to create or modify objects. The user may enter a text command in the box and hit the Enter key. In response, a spreadsheet may execute the command. In the example of FIG. 6, the command "SALES_ARRAY=0" appearing in text-box 630 may direct that all entries of the array Sales_array be set to 0. Text-box 640 indicates object that is the subject of the command entered into text-box 630. In the example of FIG. 6, that object is Sales-Array. Similarly, the expression $$A(car\_type=Toyota)=4$$

may set all elements of array A with the car_type Toyota equal to 4. The expression $$Sales(Country,Car,Year)=0$$

may create an array Sales whose dimensions are Country, Car, and Year, and may initialize all elements of the array to 0.

In some embodiments, the object commands may include commands relating to functions. The commands may specify units for the arguments. For example, to create a function, the user may type an expression similar to $$f(x)=x^2 \text{ or}$$

$$f(x \text{ ft})=x^2.$$

Both expressions cause the creation of a function whose value is the square of its argument. The second expression requires that the input argument have a unit compatible with feet. In some embodiments, the argument must have exactly the specified unit. In other arguments embodiments, other units of length, such as inches or meters may be compatible with feet. In some embodiments, the specification of units for the arguments may result in the automatic specification of units for the result, to be calculated from the units of the arguments. In this example, the units of the result may be in square feet. In other embodiments, a user may have to explicitly designate units for the result of a function.

As another example of object commands, to create an array, the user may type Sales=Volume*Price, where the array Sales is created based on the dimensions and values of the arrays Volume and Price. To create a dimension, a user may enter an expression such as $$Years:=Sequence(1900,2000)$$

Executing the expression creates a dimension named Years with elements the numbers from 1900 to 2000. In some embodiments, a dimension object may retain the expression used to create it and may update the dimension object based upon changes to the arguments to the expression.

Text-box 650 of window 600 is for cell-level expressions. The expression typed into the cell is entered into the active cell of the spreadsheet. Text-box 660 designates the active cell. In the example of FIG. 6, the active cell is C1, and text-box 660 contains the number 18, the entry in cell C1.

The expressions in window 600 of FIG. 6 are for illustration and not for limitation. In other embodiments, a text-based interface for a spreadsheet may contain other displays and perform other operations as may occur to those of skill in the arts. The text-based interface may be displayed in a pane of the worksheet or may be displayed in a different window. The window may remain open while the spreadsheet application is open, or may be opened by a user command. In many embodiments, a user may enter all commands, both object commands and cell commands, into a single text box. In a few embodiments, output from a command or other expression entered into a text-based interface may be displayed in a window of the text-based interface.

Returning to FIG. 3, display module 365 may control the display of data processed by a spreadsheet. In many cases, display module 365 may display the contents of cells in a table with rows designated by numbers and columns designated by letters, as in worksheet 400 of FIG. 4. Display module 365 includes visualization module 370. In many embodiments, the visualization module may display visualization objects in the user spreadsheet. Visualization objects may include graphs, diagrams, charts, tables, network diagrams, pictures, or other displays. These objects may be composed of data from other objects of a spreadsheet, such as arrays or dimensions. In further embodiments, visualization objects of particular types may be created by supplying parameters to routines for creating objects of the type. A graph, for example, may be created by specifying a data source; a type of graph, such as bar or line, a title; and labels for the axes. In many embodiments, a user may create a type of visualization object by providing a routine to generate objects of that type. The user may, for example, provide a user interface that provides for the easy creation of graphs. The user interface may give the user a choice of types of graphs and may allow the user to specify data sources for the generation of the graphs. In further embodiments, the user interface may also allow for the editing of existing graphs or other visualization types.

Turning to FIG. 7, depicted is the generation of a graph based upon an array. FIG. 7 includes worksheet 700 which includes array 710 and graph 730. Array 710 is a three-dimensional array based upon the same three dimensions as array 440 of FIG. 4. The dimensions are country with values USA, Canada and Mexico; car, with values Chevy, Ford, and Toyota; and color, with values red, blue, and green.

As indicated by descriptor 720 and title 740, graph 730 enumerates sales figures for Chevys. Graph 730 is based upon the figures of array 710. It includes three sets of three columns. Each set of columns displays the sales volume of Chevys of a particular color, broken down by country. For example, set 750 displays the sales of red Chevys. It includes column 760, USA sales, column 770, Canadian sales, and column 780, Mexico sales. In graph 730, the horizontal axis is labeled by elements of the dimension color, namely red, blue, and green. In some embodiments, graph 730 may be produced by expressions involving filters. An example in pseudocode (fictitious code which may be similar to actual code) may state:

```
make-bar-graph
title = "Sales USD /Resident
        Chevy"
vertical axis = list_elements (make-dimension numbers 10.0 to 70.0 by 10.0)
horizontal axis = list_elements Color
for element Chevy of dimension cars do
    for each element e of dimension Color do
        for each element f of dimension Country do
            generate_bar_graph (value = Sales_array (Chevy, e, f)
                color = color (e)
            generate_vertical_space
        end_for
    end_for
end_for
```

Lines 8 and 9 describe the title. Line 10 describes the labeling of the vertical axis—the numbers from 10.0 to 70.0 by tens. Line 11 describes the labeling of the horizontal axis. Line 12 specifies that the graph describes elements of Sales-array with car equal to Chevy, the elements of array 710 on columns B, C, and D. Line 13 specifies an enumeration over all elements of dimension Color. For each color, the graph is to enumerate sales over all countries (line 13). The result is a series of sets of three columns. Each set describes Chevy sales for a particular color and all of the countries in dimension Country. Thus, set 750 describes red Chevy sales for each of the three countries. Line 17 provides for vertical space between each set of three columns. The above pseudocode illustrates how the use of embodiments may reduce the effort in producing graphs.

FIG. 7 is for illustration and not for limitation. In other embodiments, of the invention, other types of display may be used for information, including elements of arrays and elements of other types of data structures. The information may be processed by applications other than spreadsheets.

Returning to FIG. 3, display module 365 includes reports module 375. In many embodiments, reports module 375 may display a series of visualization objects. The series may be produced by iteration over the elements of a dimension. Turning to FIG. 8, illustrated is an example report 800 based upon the data in array 440 of FIG. 4 that was used to produce the visualization object of FIG. 7. For each element of the dimension Cars, the example report 800 contains a graph of sales of the car by color and country. Graph 805 of FIG. 8 shows sales of Chevy 810, graph 830 shows sales of Ford 835, and graph 860 shows sales of Toyota 865.

In some embodiments, report 800 may be produced by code similar to the pseudocode used to produce graph 700. The pseudocode may begin with:

```
make report
for element a of dimension cars do
    make-bar-graph
    title = "Sales USD /Resident
            [element_name a]"
``` and may delete the line "for element Chevy of dimension cars do"

The first line of this pseudocode provides for making a report, a series of graphs. The graphs are produced by enumerating over the elements of the dimension cars (line 20). For each type of car, generate a bar graph. The title includes the name of the car (line 23). The rest of the code follows the pseudocode for generating the graph.

The report 800 was for illustration and not limitation. In other embodiments of the invention, other methods of displaying a series of elements from a spreadsheet may be used as may occur to those of skill in the art.

Returning to FIG. 3, reports module 375 includes presentation module 380. Presentation module 380 may create a file, such as an Adobe Acrobat file or PowerPoint file from a series of reports. The file may be used in presentations. In further embodiments, presentation module 380 may automatically insert into the file hyperlinks from one visualization object contained in the file to another visualization object in the file. A user may specify a link between the objects. Presentation module 380 may generate the file, determine the location of the objects in the file, and insert the hyperlink from one object to the other.

FIG. 3 is for illustration and not limitation. Some embodiments of a spreadsheet may omit some of the feature shown and many embodiments may include additional features. Functions of several modules may be combined in one module, or functions of one module may be split among several. In many embodiments of the invention, applications other than spreadsheets may process and present information as many occur to those of skill in the art.

Turning to FIGS. 9 through 12, contained are flowcharts (900, 1000, 1100, and 1200) of a method of performing operations in a spreadsheet in accordance with an embodiment of the invention. The method may be performed by an apparatus such as spreadsheet module 300 of FIG. 3. The method of FIG. 9 includes providing by a spreadsheet a multidimensional array type, a dimension type, a visualization type, a report type, a presentation type, a network type, a function type, and a filter type (element 905). An object of visualization type may be used to create graphs. The method also includes creating two or more dimension objects (element 910), such as the dimension objects of FIG. 4. In many cases, three or more dimension objects will be created. In some cases, the dimensions may form subsets of fields of a database. For example, a data base for a company may cover sales throughout the United States by year, item, and salesperson. The dimensions may consist of a list of the last five years, a list of items which retail for more than $100, a list of locations in Texas, and a list of salesperson with less than five years employment with the company.

Figure 9:
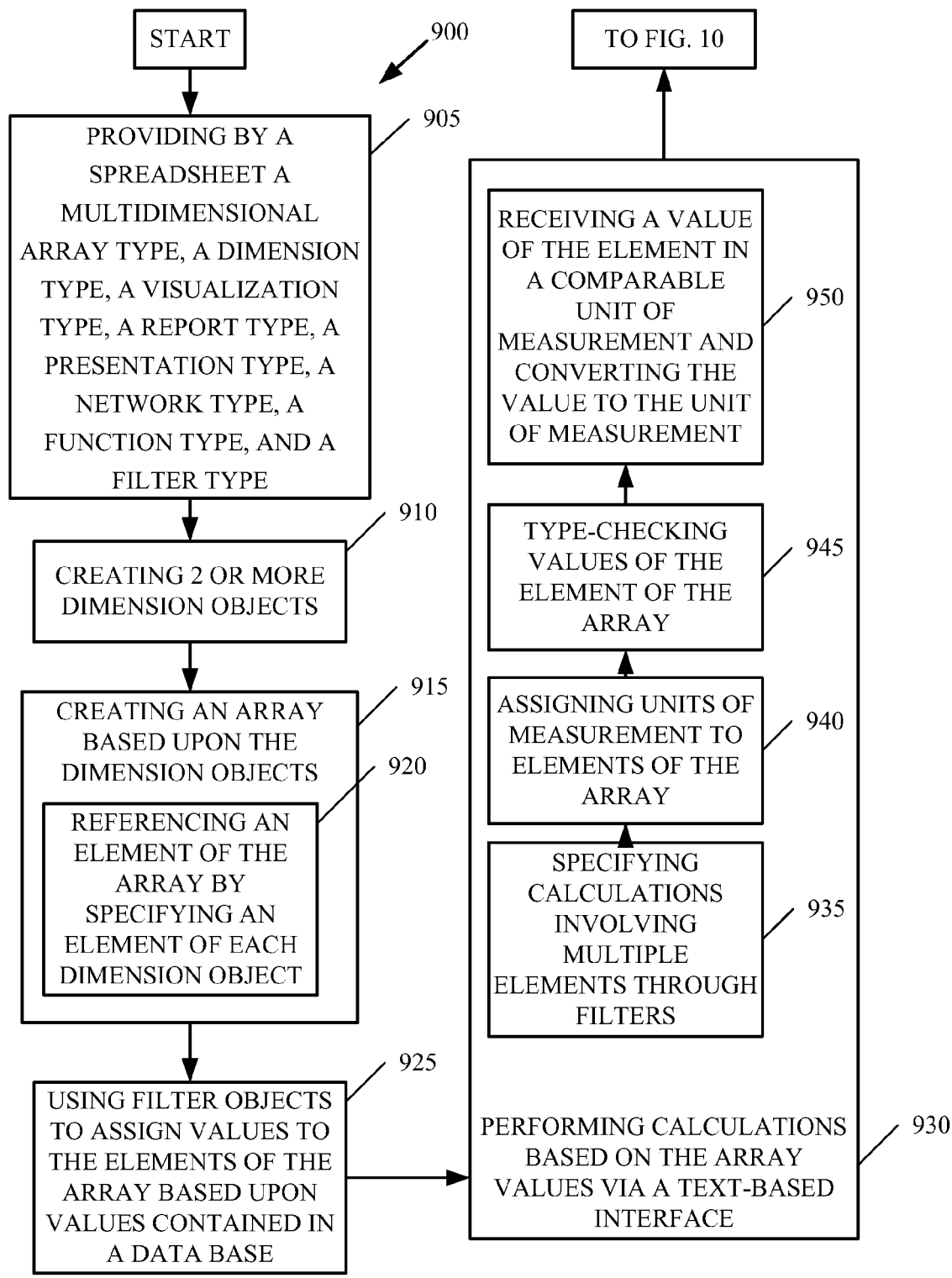
FIG. 9 is a flowchart of an embodiment of a method to perform spreadsheet operations.

The method of FIG. 9 also includes creating an array based upon the dimension objects (element 915). Sequences of elements of the dimensions operate as coordinates for the array. In particular, an element of the array may be referenced by specifying an element of each dimension object (element 920). In the above example, (#2005, #large_screen_television, #Austin_5, #Gretchen_R) may refer to an element of the array. The method includes using filter objects to assign values to the elements of the array based upon values contained in a data base (element 925). For example, the filters may be used to specify values from a data base to import into the array. The data base may be a spreadsheet data base. In other cases, other methods may be used to assign values to an array. For example, in some embodiments, an array may be created as a subarray of another array. In further embodiments, a spreadsheet user may employ filters to create the subarray. The user may specify subsets of the dimension lists of the full array to be used in creating the subarray. For example, a user may create a 2×2×2 subarray of array 540 of FIG. 5 by using the filter ((red OR green) (Ford-Toyota) (USA-Canada))). In many embodiments, a user may manually input values into an array or may use a function to assign values to an array.

A user may enter an expression involving the array into a text-based interface. The expression may specify a calculation, may create an object in the spreadsheet, or may assign a value or values to an object of the spreadsheet. In response to the entering of the expression, a spreadsheet may perform a calculation based upon the array values (element 930). For example, if the array is referred to by "A", the expression B=A+2 might give each element of array B a value obtained by adding 2 to the corresponding element of array A. The two arrays may have the same dimensions.

In some embodiments, the calculations may change the dimensions of an array. Reducing the size of an array may produce a subarray. Increasing the size of an array may be carried out by retaining the current elements of the array and leaving the new elements blank. Alternatively, they may be assigned values through formulas. For example, an array A may represent revenues. One dimension may represent the year. Increasing the years by 10 may represent modifying array A to include projections for 10 future years. The additional elements may be given values by a formula to project future income. The method of FIG. 9 may include accessing the elements of an array, through the use of filters, through displaying the elements of the array as cells of the spreadsheet, or by other methods.

The calculations may involve filters (element 935). For example, the expression:

$$A(\text{filter})=B+2$$

may modify values of A referred to by a filter. The calculations may include assigning units of measurement to elements of the array (element 940). An inventory of gasoline may be measured in gallons, for example, and distances may be specified in miles. The method may include type-checking (element 945). The type-check may eliminate errors. A value of the wrong unit or without a unit may indicate an input error. The method may also include receiving a value of the element in a comparable unit of measurement and converting the value to the unit of measurement (element 950). For example, a distance provided in kilometers may be converted to miles by multiplying by 0.621371192237.

Figure 10:
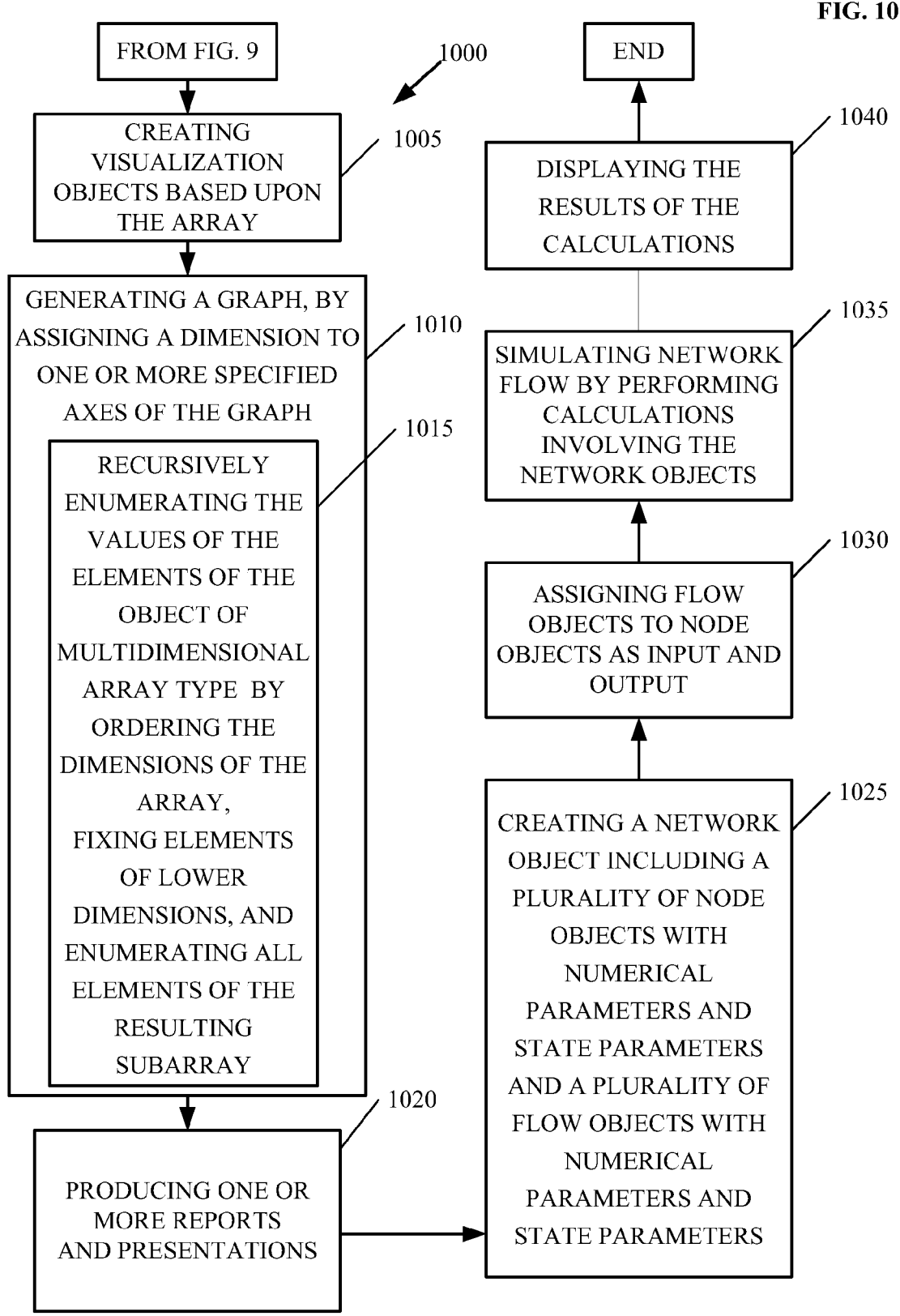
FIG. 10 is a flowchart of a further embodiment of a method to perform spreadsheet operations.

The method of FIG. 9 continues on FIG. 10 with flowchart 1000. It includes creating one or more graph type visualization objects based upon the array (element 1005). A graph object may store parameters governing the creation of a graph, such as the arrays and dimensions to display in the graph, the arrangement in which to display the dimensions, the formatting of the graph, and captions to be included with the graph. In some embodiments, a graph object may assign a dimension to one or more specified axes of the graph (element 1010). The graph may display selected elements of the array in an arrangement based upon the dimensions specified in the graph (element 1015). Some embodiments may include other types of visualization objects including project charts, decision analysis charts, quality charts, data analysis charts or other types of displays.

The method of flowchart 1000 includes producing one or more reports by using the graph objects (element 1020). In some embodiments, when a parent/child relationship exists between elements of dimensions, the report may be hierarchical. For example, the elements of the dimension States may be subdivided into child dimensions of Counties. These, in turn, may be subdivided into child dimensions of Cities. Based on these relationships, a report may present data grouped by states, by counties within state, and by cities within county. Producing the report may include creating a hierarchical sequence of filters. The hierarchical sequence may control the lower level content on each successive page of the report.

The method also includes creating a network object in a spreadsheet (element 1025). The creating may include creating nodes and flow objects in the network. A node may include design parameters which specify the operation of the node. A node may also include state parameters which specify the state of the node. In several embodiments, the parameters may include probabilities for decision alternatives, enabling a network to be analyzed as a decision tree. In some embodiments, a node may include parameters representing artificial neural networks. Similarly, a flow object may also include design parameters and state parameters. The network may include an assignment of flow objects to nodes as input and output (element 1030). In some embodiments, flow may be circular. In some embodiments, the method may include creating a tree object as a sub network of the network. The tree object may not contain a flow loop.

The method may include simulating network flow by performing calculations involving the network objects (element 1035). In some embodiments, the simulation may model a neural net. The method may also include displaying the results of the calculations (element 1040).

Figure 11:
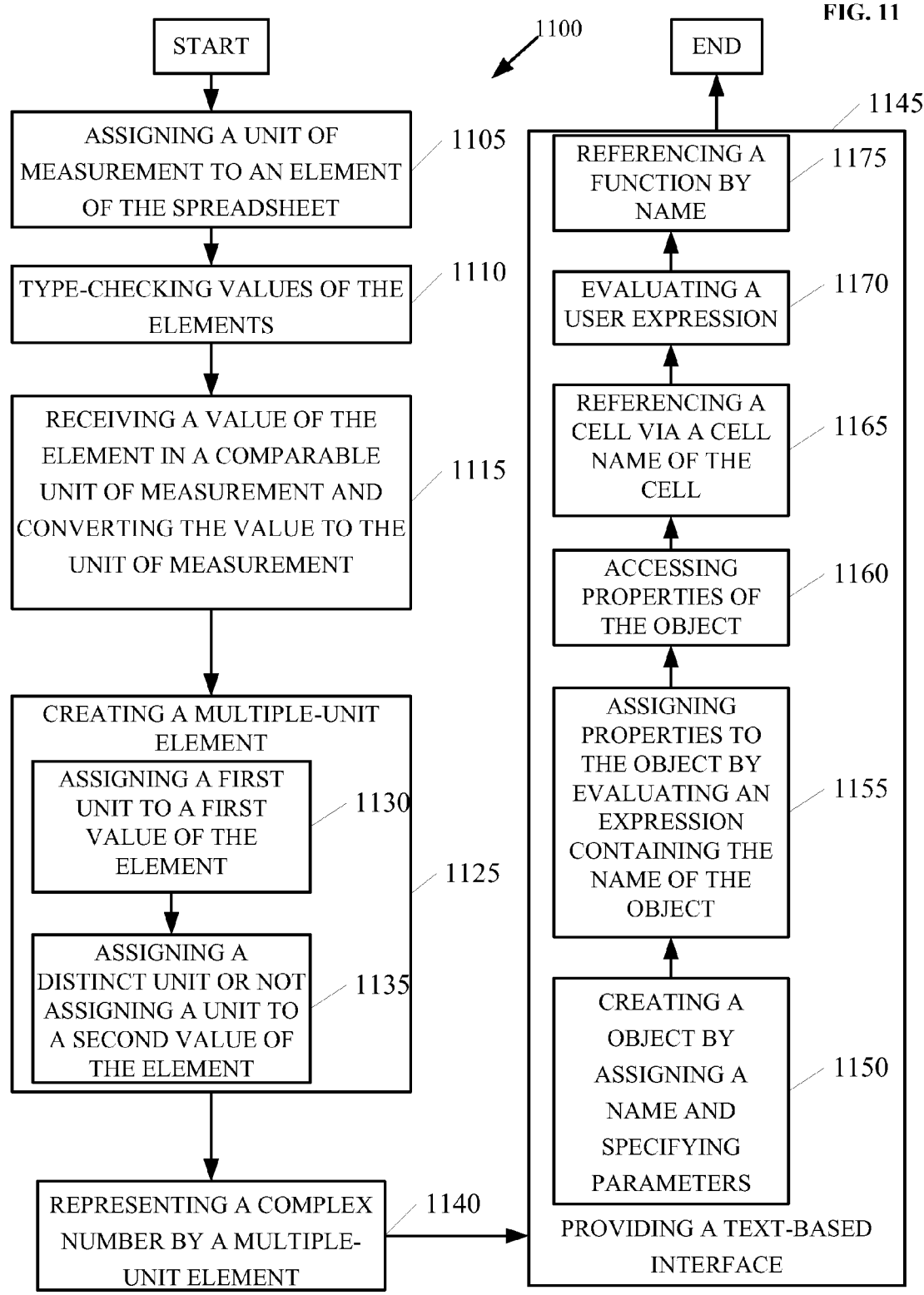
FIG. 11 is a flowchart of a further embodiment of a method to perform spreadsheet operations.

FIG. 11 depicts a flowchart 1100 containing a further method of performing spreadsheet operations. The method of FIG. 11 may include assigning a unit of measurement to an element of a spreadsheet (element 1105). The method may be performed by an apparatus such as spreadsheet module 300 of FIG. 3. The method may include performing calculations with the element of the spreadsheet. The calculations may include type-checking values of the element of the spreadsheet (element 1110). For example, assigning the value 1 to a element with unit "ft" may produce an error message, since the value does not include a unit. The method may include conversion, receiving a value of the element in a comparable unit of measurement and converting the value to the assigned unit of measurement (element 1115). For example, the assignment of a value of 3 yards to an element with unit "ft" may produce a value of 9 ft for the element.

The method may include creating a spreadsheet element with multiple units (element 1125). The creation may include assigning a first unit to a first value of the element (element 1130). The method may include assigning a distinct unit or not assigning a unit to a second value of the element (element 1135). Examples may include 4 ft+5 yrs, and 1+4 ft+5 years. In the second example, no unit is assigned to the first value.

The method may include representing a complex number by a spreadsheet element with multiple units (element 1140). An element of the form a+bi, where no unit is assigned to the value a and b is assigned the unit i, where i is the square root of −1, may represent a complex number. I denotes the principal square root of −1. Graphically, it appears at the point (0, 1).

The method may include the spreadsheet providing a text-based interface (element 1145), such as the interface of FIG. 6. The method may include creating a spreadsheet object in the text-based interface. Creating the object may include assigning a name to the object and specifying a set of parameters for the object (element 1150). The method may also include assigning properties to the spreadsheet object by evaluating an expression containing the name of the spreadsheet object (element 1155). The method may also include accessing properties of the spreadsheet object through the text-based interface (element 1160).

In the embodiment of FIG. 11, a text-based interface may recognize references to cell names as well as the names used to create objects. The value of a cell may be referenced by a cell name, such as G: 16 (element 1165). The method of FIG. 11 also includes evaluating a user expression (element 1170). The expression may describe a calculation. Accordingly, in some embodiments, the text-based interface may perform the functions of a calculator without the need to insert elements in a spreadsheet. The method of FIG. 11 also includes referencing a function by name (element 1175). For example, a user may assign the name "F" to a function and type the expression F (3 ft) in a text-based interface for evaluation.

Figure 12:
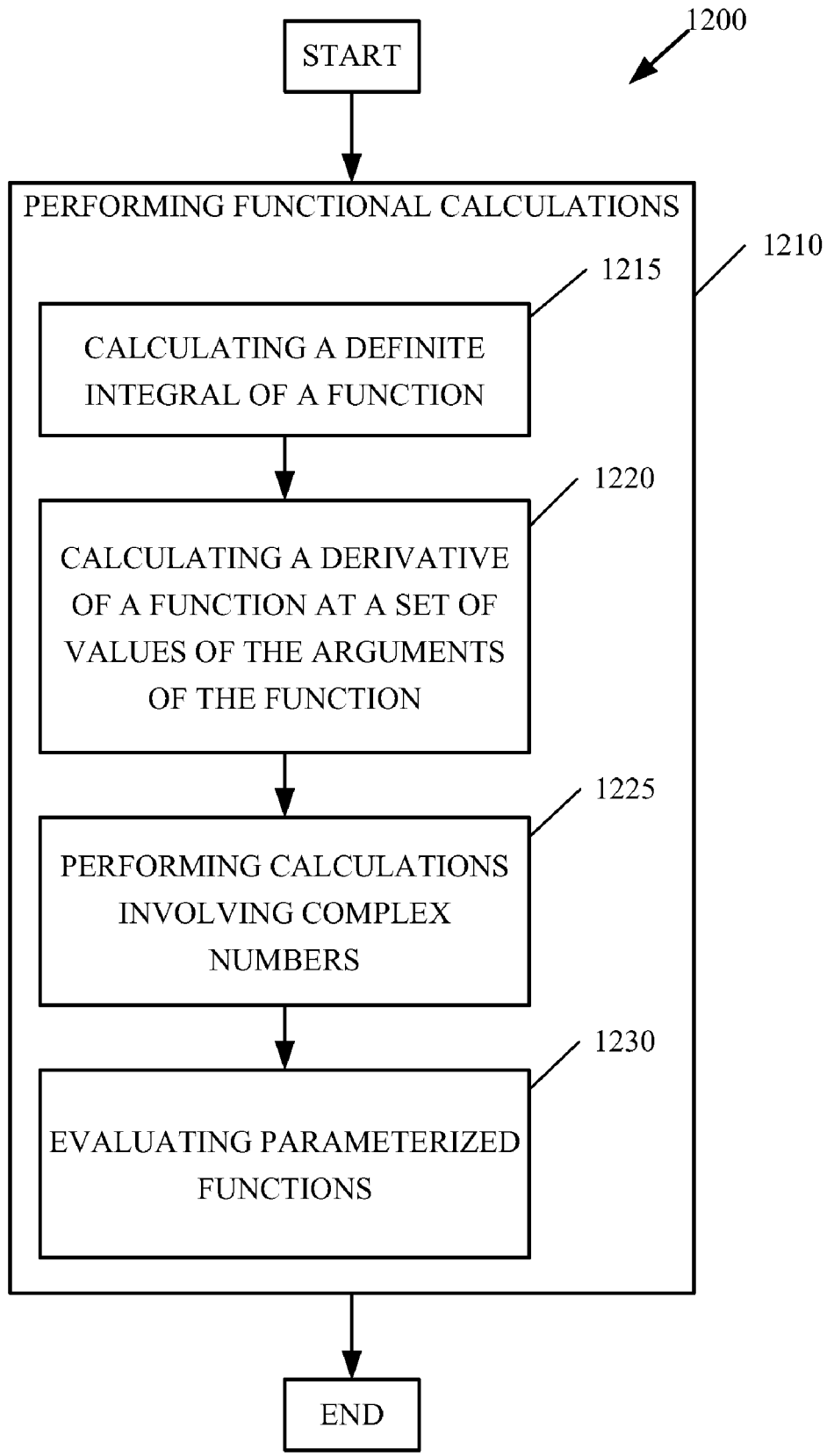
FIG. 12 is a flowchart of a further embodiment of a method to perform spreadsheet operations.

Turning to FIG. 12, depicted is a flowchart 1200 of an embodiment of a method to perform functional calculations (element 1210). The method may be performed by an apparatus such as spreadsheet module 300 of FIG. 3. The calculations may involve applying a function to given values or finding an inverse of a function. Flowchart 1200 includes calculating a definite integral of a function (element 1215). Flowchart 1200 also includes calculating a derivative of a function at a set of values of the arguments of the function (element 1220). Flowchart 1200 also includes performing calculations involving complex numbers (element 1225). The calculations may include arithmetic, polynomials, exponentials, trigonometric functions, and other functions defined on complex variables.

The method of flowchart 1200 also includes evaluating parameterized functions (element 1230). The definition of a function may include a set of parameters. For instance, the function F may be defined by:

$$F(x)=ax+bx^2$$

In this definition, a and b are parameters of the function f. The value of a function may depend both on the values of variables and the values of the parameters. A parameterized function may represent a family of similar functions. For example, a function describing the effects of braking may depend on properties of the surface. These may be represented by parameters. In further embodiments, arrays may contain values of the parameters. A spreadsheet may select parameter values from an array and evaluate the function on values of its arguments.

The elements of flowcharts 900, 1000, 1100, and 1200 are for illustration and not for limitation. In alternative embodiments, additional elements may be included, some of the elements of flowcharts 900, 1000, 1100, and 1200 may be omitted, or the elements may be performed in a different order. In some embodiments, sequences of non-negative integers may serve as indices of arrays. For example, an element of a three-dimensional array A may be referred to as A(2, 8, 5). In some further embodiments, these numerical indices may be the only method of addressing array elements. In other further embodiments, both methods may be permissible. In many embodiment of the invention, applications other than spreadsheets, such as SAS, SPSS or MathCAD may process and present information. These non-spreadsheet applications may, for example, may create dimensions, create arrays based on dimensions, or use dimensions to access the elements of the arrays, in applications other than spreadsheets.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium.

Any combination of one or more computer readable medium(s) may be utilized. The computer-readable medium may be, for example but not limited to, an electronic, magnetic, optical, electromagnetic, or semiconductor system, apparatus, or device. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, or a magnetic storage device. In the context of this document, a computer-readable medium may be any medium that can contain or store the program for use by or in connection with the instruction execution system, apparatus, or device.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

It will be apparent to those skilled in the art having the benefit of this disclosure that the present invention contemplates methods and arrangements for performing operations with a spreadsheet or other applications capable of processing and presenting information. It is understood that the form of the invention shown and described in the detailed description and the drawings are to be taken merely as examples. It is intended that the following claims be interpreted broadly to embrace all the variations of the example embodiments disclosed.

Although the present invention and some of its advantages have been described in detail for some embodiments, it should be understood that various changes, substitutions and alterations can be made herein without departing from the spirit and scope of the invention as defined by the appended claims. Although an embodiment of the invention may achieve multiple objectives, not every embodiment falling within the scope of the attached claims will achieve every objective. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A computer program product for performing operations via a spreadsheet, the computer program product comprising:
one or more computer-readable, tangible storage devices;
program instructions, stored on at least one of the one or more storage devices, to create in the spreadsheet a multidimensional array object, wherein:
at least one element of the multidimensional array object constitutes an array with a plurality of elements, wherein the multidimensional array object comprise a set of elements, one element for each distinct list of coordinates of the multidimensional array object, the list of coordinates comprising a coordinate for each dimension of the multidimensional array object;
program instructions, stored on at least one of the one or more storage devices, to access the elements of the multidimensional array object, the accessing comprising displaying the elements of the multidimensional array object as cells of the spreadsheet; and
program instructions, stored on at least one of the one or more storage devices, to modify the elements of the multidimensional array object via modifying the contents of the cells of the spreadsheet.

2. The computer program product of claim 1, wherein:
the computer program product further comprises:
program instructions, stored on at least one of the one or more storage devices, to provide by the spreadsheet a dimension type, an object of the type comprising a list of elements; and
program instructions, stored on at least one of the one or more storage devices, to create in the spreadsheet a plurality of dimension objects; and
the program instructions to create the multidimensional array object comprise program instructions, stored on at least one of the one or more storage devices, to assign a dimension object to each dimension of the multidimensional array object, wherein the elements of the dimension object constitute the coordinates of the array along the dimension.

3. The computer program product of claim 1, wherein the program instructions to access comprise program instructions, stored on at least one of the one or more storage devices, to access content from an external data source, the external data source comprising a table, the accessing content from the external data source comprising:
specifying a location of the external data source via a property in the multidimensional array object; and
specifying a name of the table.

4. The computer program product of claim 3, wherein:
the external data source comprises a database; and
the computer program product further comprises program instructions, stored on at least one of the one or more storage devices, to add a record to a table of the database, wherein the record contains a path to a workbook of the spreadsheet and a name of the multidimensional array.

5. The computer program product of claim 1, further comprising:
program instructions, stored on at least one of the one or more storage devices, to link a multidimensional array object of a first workbook to a multidimensional array object of a second workbook, the linking comprising:
specifying a path to the second workbook;
specifying a name of the second workbook;
specifying a name of the multidimensional array object of the second workbook; and
specifying an external array object name; and
program instructions, stored on at least one of the one or more storage devices, to refer to the multidimensional array object of the second workbook via a reference to the multidimensional array object of the first workbook.

6. A computer program product for performing operations via a spreadsheet, the computer program product comprising:
program instructions, stored on at least one of the one or more storage devices, to provide by a spreadsheet a dimension type, a dimension object comprising one or more elements and having a name;
program instructions, stored on at least one of the one or more storage devices, to create by the spreadsheet a dimension object, the dimension object comprising one or more elements, the creating comprising:
evaluating an expression entered into a text-based interface of the spreadsheet, wherein the expression includes a function and the dimension object is an output value of the function; and
assigning to each element of the dimension object a name unique in the dimension object; and
program instructions, stored on at least one of the one or more storage devices, to specify a sequence of the one or more elements.

7. The computer program product of claim 6, further comprising:
program instructions, stored on at least one of the one or more storage devices, to map elements of the dimension object to other dimension objects, comprising one or more elements, wherein:
an element of the dimension object is mapped to another dimension object of the other dimension objects, the other dimension object comprising two or more elements; and
the two or more elements of the other dimension object represent subclasses of the element of the dimension object.

8. The computer program product of claim 6, wherein the program instructions to create by the spreadsheet a dimension object comprises:
program instructions to create in the spreadsheet a filter object, wherein the filter object is a dimension object and each element of the filter object refers to an element of some other dimension object; and
program instructions for a user to access the filter object by a name of the filter object.

9. The computer program product of claim 8, wherein:
the computer product further comprises program instructions to create an array object based upon a set of dimension objects; and
the program instructions to create the filter object comprise program instructions to reference one or more elements of the array object by the filter object, wherein:
the one or more elements of the filter object refer to one or more elements of the set of dimension objects; and
a specification of the one or more elements of the set of dimension objects comprise a reference to the one or more elements of the array object.

10. The computer program product of claim 9, wherein the program instructions to create the filter object comprise program instructions to specify a Boolean combination of the elements of the filter.

11. The computer program product of claim 9, wherein the program instructions to create the filter object comprise program instructions to create a filter object containing one element from each dimension of the set of dimensions of the array.

12. A computer program product to perform operations via a spreadsheet, the computer program product comprising:
program instructions, stored on at least one of the one or more storage devices, to provide a visualization type;
program instructions, stored on at least one of the one or more storage devices, to create a visualization object, comprising:
program instructions to receive from a user a name of a subroutine for initializing the visualization object;
program instructions to receive from the user a specification of one or one or more parameters of the subroutine; and
program instructions to receive from the user a specification of values for the parameters of the subroutine; and
program instructions to display via the visualization object the objects supplied as values of the parameters.

13. The computer program product of claim 12, the computer program product further comprising:
program instructions, stored on at least one of the one or more storage devices, to provide a report type;
program instructions, stored on at least one of the one or more storage devices, to create a report object, the creating comprising specifying a dimension, the dimension comprising an ordered list of a plurality of elements; and
program instructions, stored on at least one of the one or more storage devices, to display the report object, the displaying comprising displaying a visualization object for each element of the dimension.

14. The computer program product of claim 13, further comprising:
program instructions, stored on at least one of the one or more storage devices, to provide a presentation type;
program instructions, stored on at least one of the one or more storage devices, to create a presentation object, the creating comprising specifying a sequence of two or more reports; and
program instructions, stored on at least one of the one or more storage devices, to create a presentation object file based upon the presentation object, the presentation object file containing the two or more reports in the specified sequence.

15. A computer program product to perform operations via a spreadsheet, the computer program product comprising:
program instructions, stored on at least one of the one or more storage devices, to provide by the spreadsheet a unit type;
program instructions, stored on at least one of the one or more storage devices, to create in the spreadsheet one or more objects of unit type, the creating an object of unit type comprising:
receiving from a user a specification of the object of unit type; and
in response to the receiving, creating the object of unit type;
program instructions, stored on at least one of the one or more storage devices, to assign the object of unit type to an element of a spreadsheet; and
program instructions, stored on at least one of the one or more storage devices, to perform calculations with the element of the spreadsheet, the performing comprising type-checking values of the element of the spreadsheet.

16. The computer program product of claim 15, wherein:
the program instructions to assign comprises program instructions to assign the object of unit type to the element, the object of unit type comprising a unit of measurement; and
the program instructions to perform calculations comprise program instructions to receive a value of the element in a comparable unit of measurement and to convert the value to the unit of measurement.

17. The computer program product of claim 16, wherein the program instructions to assign comprise program instructions to assign the unit of measurement to an argument of a function.

18. A computer program product to perform operations via a spreadsheet, the computer program product comprising:
program instructions, stored on at least one of the one or more storage devices, to provide by a spreadsheet a text-based interface;
program instructions, stored on at least one of the one or more storage devices, to create in the interface an object in the spreadsheet, the creating comprising:
assigning a name to the object in the spreadsheet; and
specifying a set of parameters for the object in the spreadsheet, wherein the creating comprises evaluating an expression entered via the text-based interface; and
program instructions, stored on at least one of the one or more storage devices, to assign one or more values to one or more elements of the object in the spreadsheet, the assigning comprising evaluating an expression entered via the text-based interface, the expression containing the name of the object in the spreadsheet; and
program instructions, stored on at least one of the one or more storage devices, to access a value of an element of the object in the spreadsheet via the text-based interface.

19. The computer program product of claim 2, wherein the program instructions to access comprise program instructions to refer to one of the one or more elements of the multidimensional array object via a specification of one element from each of the plurality of dimension objects.

20. The computer program product of claim 1, wherein:
the program instructions to access comprise program instructions to display the elements of the multidimensional array object as cells of a single worksheet.

21. A computer program product for performing operations via a spreadsheet, the computer program product comprising:
program instructions, stored on at least one of the one or more storage devices, to create in the spreadsheet a named array object of three or more dimensions;
program instructions, stored on at least one of the one or more storage devices, to access elements of the named array object of three or more dimensions, wherein:
the multidimensional array object comprise a set of values, one value for each distinct list of coordinates of the multidimensional array object, the list of coordinates comprising a coordinate for each dimension of the multidimensional array object; and
the accessing comprises:
displaying the elements of the array object as cells of the spreadsheet; and
referencing the array object by name in an expression entered into a text-based interface of the spreadsheet, the expression including the name of the array object; and
program instructions, stored on at least one of the one or more storage devices, to modify elements of the array object via modifying the contents of the cells of the spreadsheet.

22. The computer program product of claim 21, wherein the program instructions to access and the program instructions to modify comprise program instructions to reference and modify values of elements of the array object by evaluating expressions entered into the text-based interface of the spreadsheet, the expressions containing the name of the array object and coordinates of the array object.

23. The computer program product of claim 21, wherein the program instructions to create comprise program instructions to create a workbook, the workbook comprising the named array object of three or more dimensions and one or more other array elements, wherein one or more cells of the workbook contain values of objects other than the named array object and the one or more other array elements.

24. The computer program product of claim 6, wherein the program instructions to create a dimension object comprise program instructions to store each element of the dimension object as a cell of the spreadsheet.

25. The computer program product of claim 2, further comprising:
program instructions, stored on at least one of the one or more storage devices, to receive from a user a specification of a change to at least one dimension object of the dimension objects assigned to the multidimensional array object and to change the at least one dimension object in response to the specification of a change; and
program instructions, stored on at least one of the one or more storage devices, to automatically change the multidimensional array object based upon the change to the at least one dimension object.

* * * * *